United States Patent [19]

Christini et al.

[11] E Re. 29,285

[45] Reissued June 28, 1977

[54] METHOD FOR CONCOMITANT PARTICULATE DIAMOND DEPOSITION IN ELECTROLESS PLATING, AND THE PRODUCT THEREOF

[75] Inventors: Theodore Peter Christini, Dushore, Pa.; Albert Lawrence Eustice, Lewiston, N.Y.; Arthur Hughes Graham, Wilmington, Del.

[73] Assignee: E. I. Du Pont de Nemours and Company, Wilmington, Del.

[22] Filed: June 7, 1976

[21] Appl. No.: 694,047

Related U.S. Patent Documents

Reissue of:

[64] Patent No.: 3,936,577
Issued: Feb. 3, 1976
Appl. No.: 341,529
Filed: Mar. 15, 1973

U.S. Applications:

[63] Continuation-in-part of Ser. No. 208,233, Dec. 15, 1971, abandoned.

[52] U.S. Cl. ..... 428/426; 428/323; 428/433; 427/438; 427/305; 51/309 R; 106/1; 75/.5 R

[51] Int. Cl.[2] ..... B32B 15/00; B05D 3/10

[58] Field of Search ..... 428/426, 323, 433; 427/438, 305; 51/309; 75/.5 R; 106/1; 29/195, 196.6

[56] References Cited

UNITED STATES PATENTS

| | | | |
|---|---|---|---|
| 2,858,256 | 10/1958 | Fahnoe et al. | 51/309 |
| 3,061,525 | 6/1959 | Grazen | 204/9 |
| 3,212,918 | 10/1965 | Tsu et al. | 117/47 A |
| 3,379,556 | 4/1968 | Chiecchi | 117/47 A |
| 3,484,282 | 12/1969 | Gabler et al. | 117/47 A |
| 3,617,363 | 11/1971 | Metzger et al. | 117/130 E |
| 3,644,183 | 2/1972 | Odekerken | 117/130 E |
| 3,674,447 | 7/1972 | Bellis | 29/196.6 |
| 3,753,667 | 8/1973 | Metzger et al. | 29/195 |

FOREIGN PATENTS OR APPLICATIONS

| | | | |
|---|---|---|---|
| 709,470 | 1/1968 | Belgium | |
| 1,621,206 | 6/1971 | Germany | 117/130 E |

OTHER PUBLICATIONS

Translation of German Offen. 1621206.

*Primary Examiner*—John D. Welsh

[57] ABSTRACT

This invention is a method for depositing on an article a coating containing at least one member of the group metals and metal alloys plus particulate dispersed diamond comprising contacting the surface of the article with a stable electroless plating bath consisting essentially of an aqueous solution of soluble constituents of the group, electroless reducing agent therefor, a suspension of diamond particles therein and a stabilizer, and maintaining the diamond particles in suspension throughout the bath during the coating of the article for a time sufficient to produce a preselected depth of coating on the article, and the coated article per se.

6 Claims, 12 Drawing Figures

ELECTROLESS Ni-B/12μ SYNTHETIC DIAMOND "A", 6340X

FIG. I

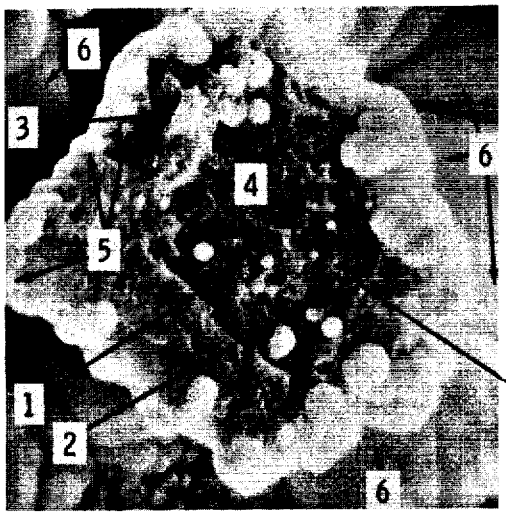

(1) RECESSED GROWTH LEDGE (2) CRATER (3) UPSTANDING GROWTH PROJECTION (4) Ni-B ALLOY GRAINS NUCLEATED ON DIAMOND "A" SURFACE (5) Ni-B ALLOY GRAINS NUCLEATED ON DIAMOND "A" EDGES (6) Ni-B ALLOY GRAIN MATRIX (7) DIAMOND SURFACE

FIG. II

ELECTROLESS Ni-B/9μ NATURAL DIAMOND, 6480X

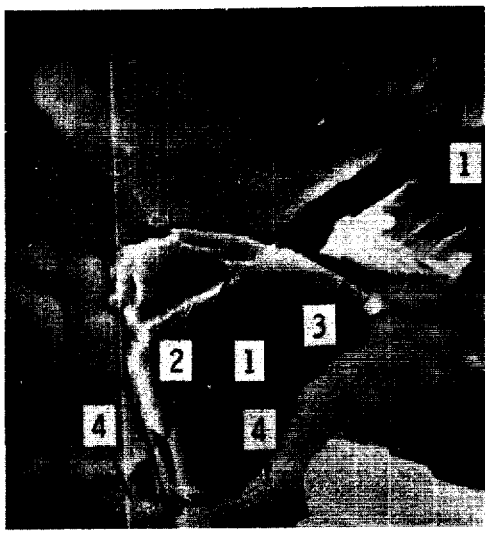

(5)

(1) CHARACTERISTIC SMOOTH DEFECT-FREE NATURAL DIAMOND SURFACE (2) RECESSED GROWTH LEDGES (3) Ni-B ALLOY GRAIN NUCLEATION (4) Ni-B ALLOY GRAIN MATRIX (5) DEFECT FROM SCANNING ELECTRON MICROSCOPE

Fig. III A.
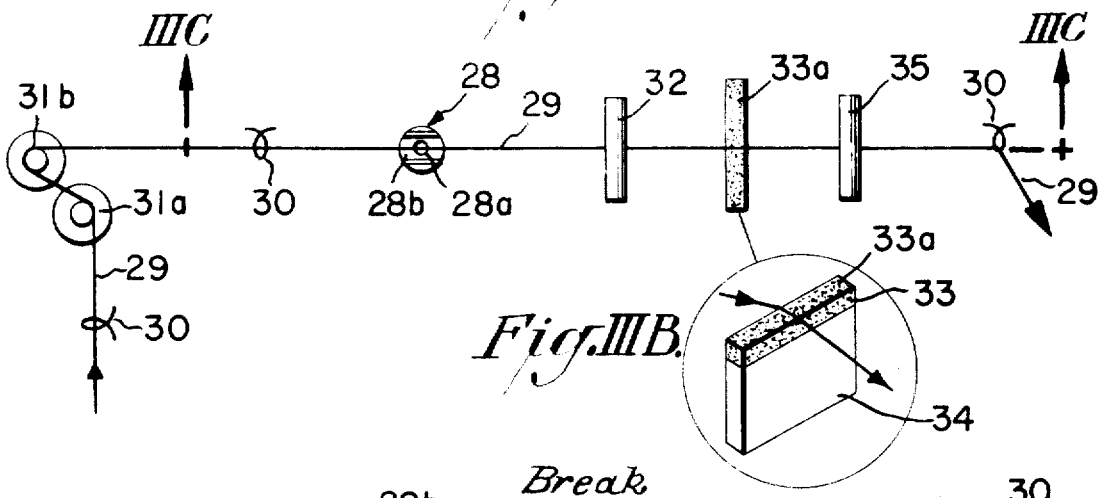
Fig. III B.
Fig. III C.
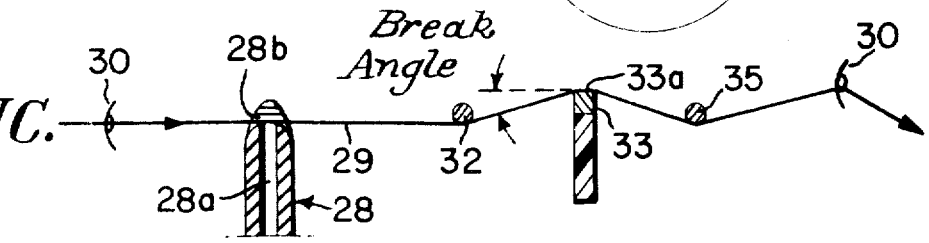
Fig. III D.
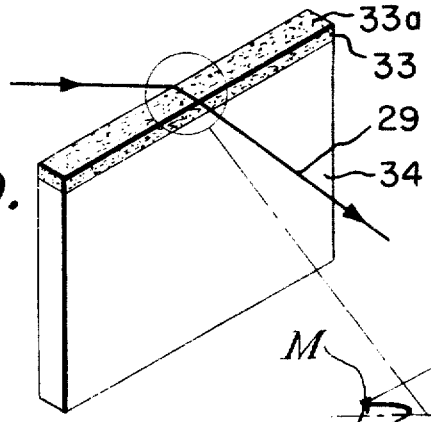
M-Edge-Cut Grooves From Invalid Standard Test
N-Normal Groove From Valid Accelerated Test
Fig. III E.
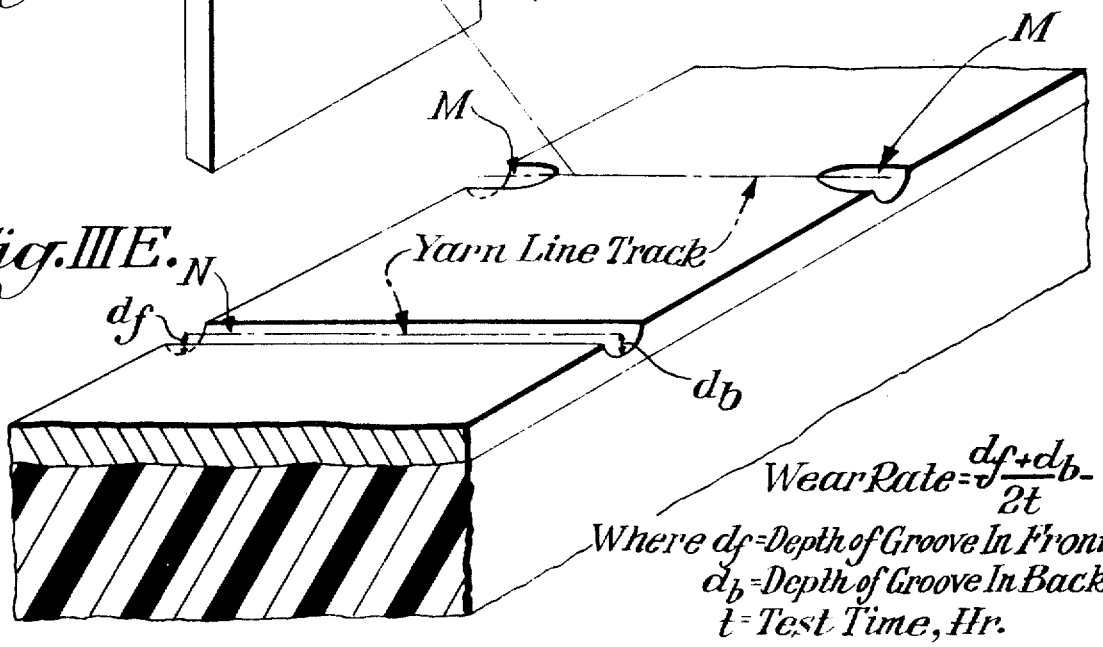
$$\text{Wear Rate} = \frac{d_f + d_b}{2t}$$
Where $d_f$ = Depth of Groove In Front
$d_b$ = Depth of Groove In Back
$t$ = Test Time, Hr.

FIG. IV

ELECTROLESS Ni-B/9μ NATURAL DIAMOND, 2860X

YARN COURSE

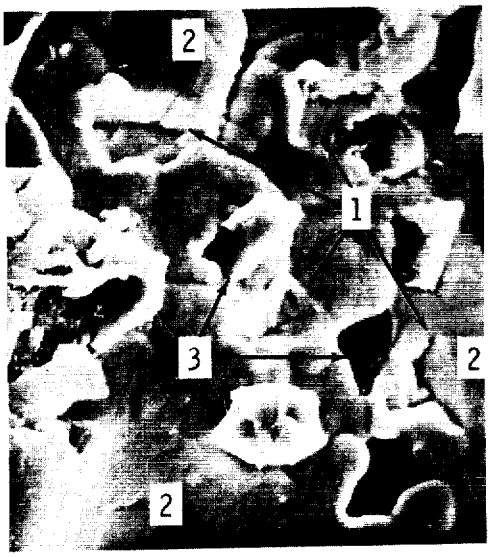

YARN COURSE

STANDARD WEAR TEST:

[15 DENIER DULL MONOFILAMENT NYLON DRAWN OVER SAMPLE AT 1000 YDS/MIN. FOR 24 HRS. WITH BREAK ANGLE 10° AND MONO-FILAMENT TENSION 15 GMS.]

(1) DIAMOND PULL-OUT (2) Ni-B ALLOY MATRIX (3) DIAMOND PARTICLES IN Ni-B ALLOY MATRIX

FIG. V

ELECTROLESS Ni-B /9μ SYNTHETIC DIAMOND "A", 2640X

ACCELERATED WEAR TEST

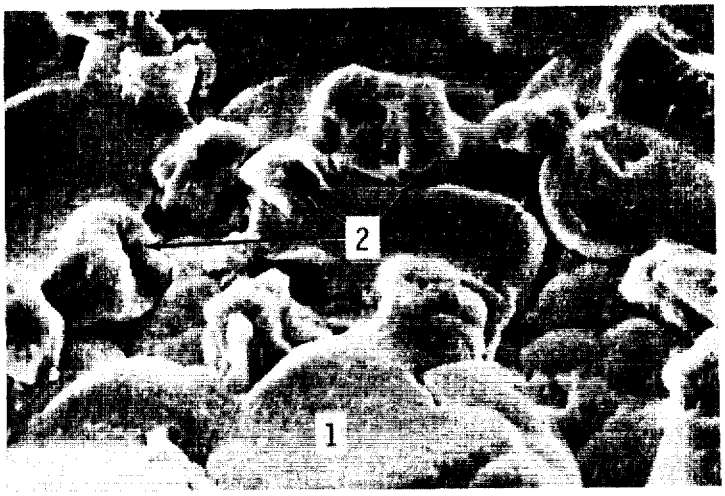

YARN COURSE (1) Ni-B ALLOY MATRIX ON SIDE OF WEAR GROOVE (2) DIAMOND PARTICLES IN Ni-B ALLOY MATRIX

FIG. VI
ELECTROLESS Ni-B/9μ SYNTHETIC DIAMOND "A", 250X
(PLAN VIEWS)
(A) AS-PLATED SURFACE
(B) ACCELERATED WEAR GROOVE
YARN COURSE ⟶
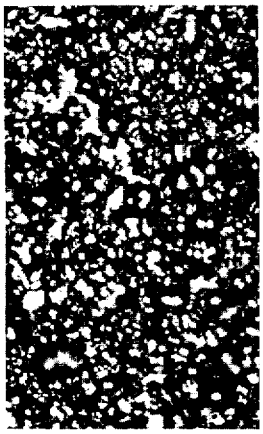
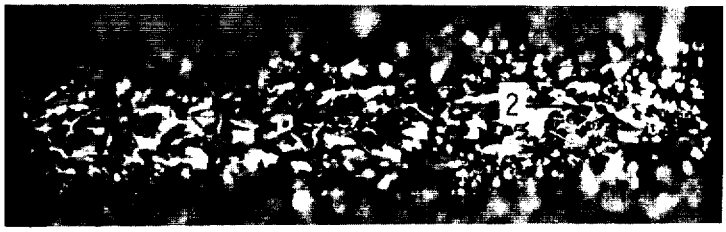
LEADING EDGE
(2) WEAR GROOVE
TRAILING EDGE
FIG. VII
ELECTROLESS Ni-B/9μ NATURAL DIAMOND, 250X
(PLAN VIEWS)
(A) AS-PLATED SURFACE
(B) ACCELERATED WEAR GROOVE
YARN COURSE ⟶
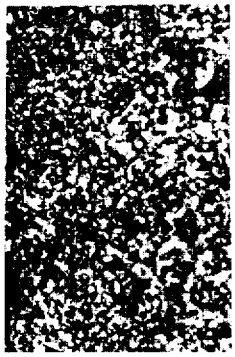
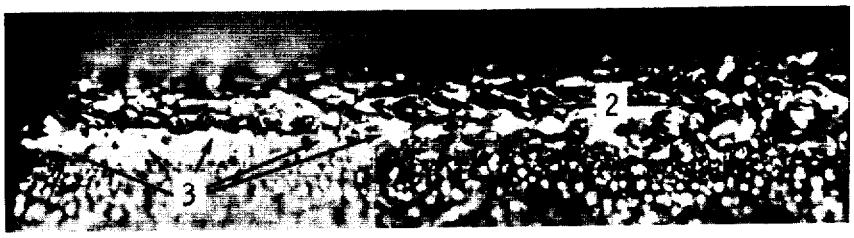
LEADING EDGE
(2) WEAR GROOVE
TRAILING EDGE
(3) AREAS OF POLISHED Ni-B MATRIX ALLOY FIG. VIII
ELECTROLESS Ni-B/9$\mu$ SYNTHETIC DIAMOND "B", 250X
(PLAN VIEWS)
(A) AS-PLATED SURFACE
(B) ACCELERATED WEAR GROOVE
YARN COURSE →
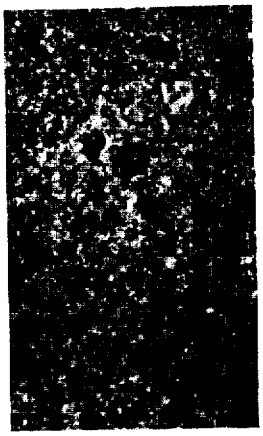
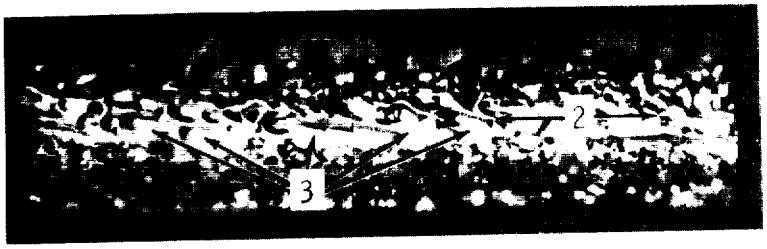
(2) WEAR GROOVE
(3) AREAS OF POLISHED Ni-B MATRIX ALLOY
LEADING EDGE
TRAILING EDGE

*Fig. IX.*
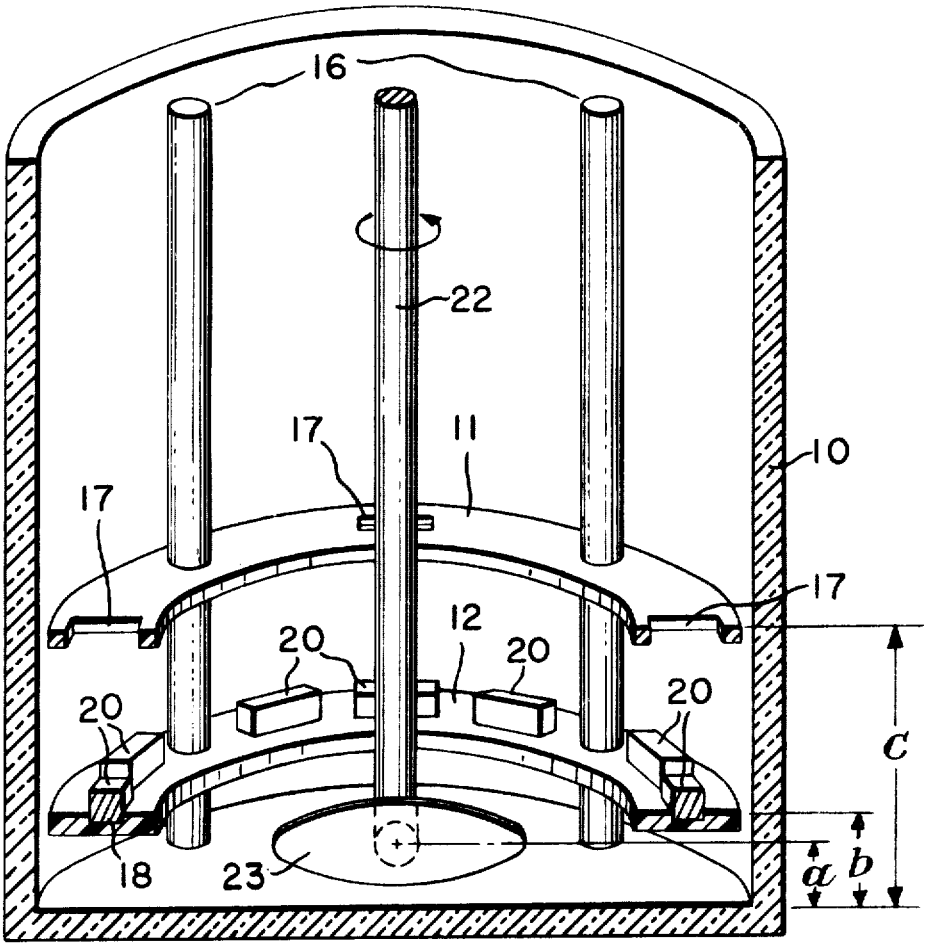

FIG. X.
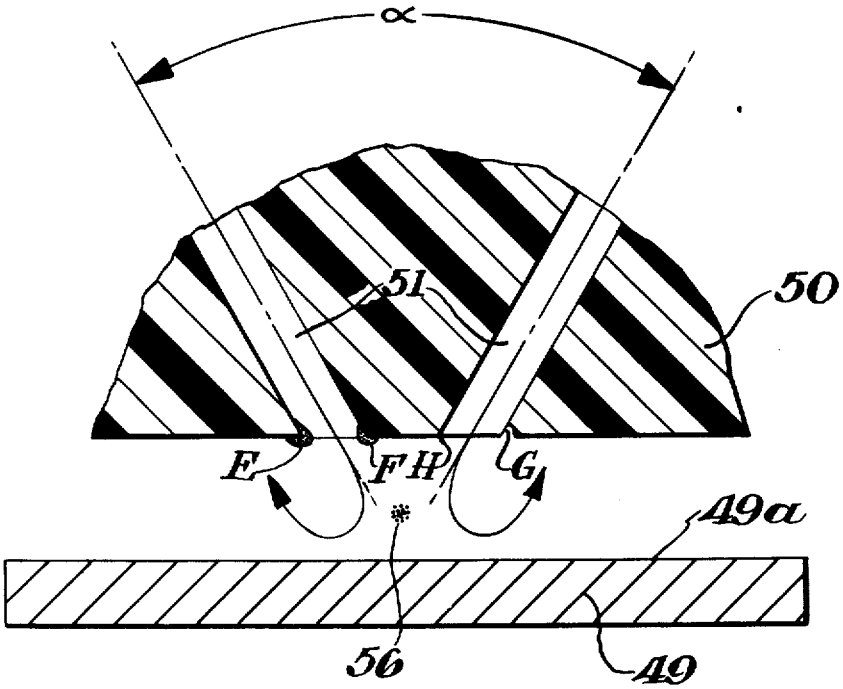
FIG. XI.
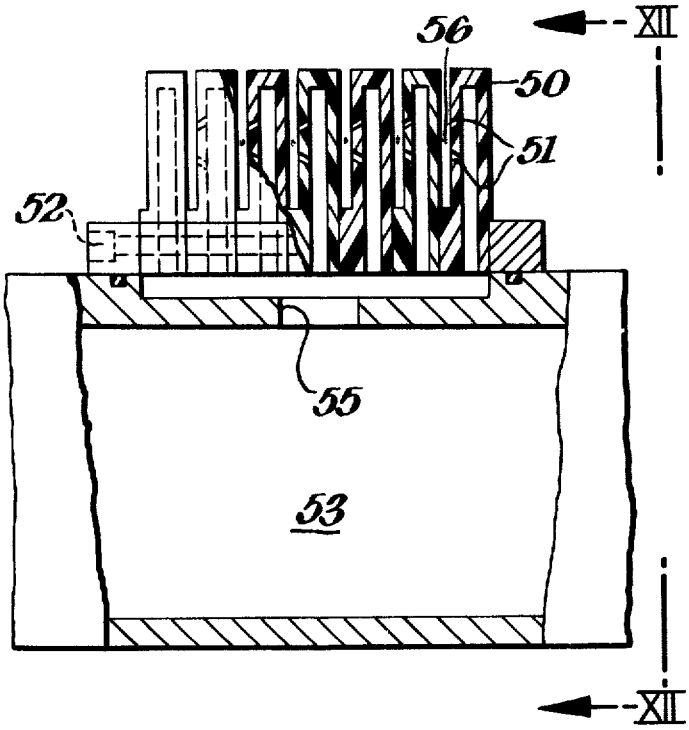
FIG. XII.
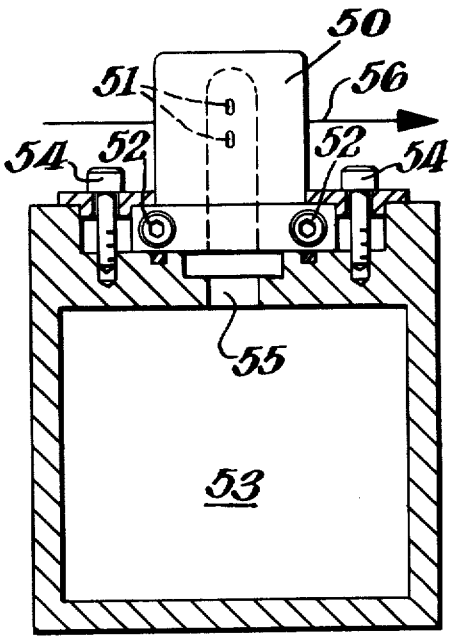

METHOD FOR CONCOMITANT PARTICULATE DIAMOND DEPOSITION IN ELECTROLESS PLATING, AND THE PRODUCT THEREOF

Matter enclosed in heavy brackets [ ] appears in the original patent but forms no part of this reissue specification; matter printed in italics indicates the additions made by reissue.

CROSS REFERENCE TO RELATED APPLICATION

This application is a continuous-in-part of U.S. application Ser. No. 208,233, now abandoned, filed on Dec. 15, 1971.

BRIEF SUMMARY OF THE INVENTION

Generally, this invention consists of a method for depositing on an article a coating containing at least one member of the group metals and metal alloys and incorporating therein particulate dispersed diamond comprising contacting the surface of the article with a stable electroless plating bath consisting essentially of: (1) an aqueous solution of soluble constituents of the group, (2) electroless reducing agent therefor, (3) a suspension of diamond particles in concentration in the range maintaining fluidity of the bath, (4) a stabilizer for the bath of concentration in the range from that sufficient to prevent decomposition of the bath upon addition of diamond particles thereto to that retaining plating capability of the bath, and (5) additives facilitating electroless plating per se, and maintaining the diamond particles in suspension throughout the bath during coating of the article for a time sufficient to produce a preselected depth of coating on the article, together with the product of the method.

DRAWINGS

The following drawings, some of which are reproductions of marked-up photomicrographs and some of which are partially schematic line drawings, depict the composite structures obtained, the wear tracks developed during running yarn frictional testing of the several types of structures, and the test apparatus and its component orientation with respect to test specimens, plus a preferred deposition apparatus, in which:

FIG. I is a typical photographic plan view (6340X) of an electroless Ni-B alloy/12$\mu$ synthetic diamond "A" composite with the several most important structural features indicated by characteristic numerals, FIG. II is a typical photographic plan view (6480X) of an electroless Ni-B alloy/9$\mu$ natural diamond composite, with individual structural features identified, FIG. III(A)–(E), inclusive, are partially schematic representations of the Accelerated Wear Test apparatus employed, and the results obtained, in the evaluation of the best composite coatings laid down by this invention, as to which (A) is a plan view of the test apparatus (B) is an inset perspective of the running yarn course over the surface of a specimen in test, (C) is a side elevation view, partly in section, taken on line IIIC—IIIC, FIG. IIIA, (D) is a perspective view of the relationship of running yarn line to specimen in an invalid Standard Test which yields corner notching [FIG. III(M)] without a wear track on the mid-specimen surface between the notches and III(E) [N] is a showing of a typical normal groove obtained during a valid Accelerated Wear Test, FIG. IV is a typical photographic plan view (2860X) of an electroless Ni-B alloy/9$\mu$ natural diamond composite indicating the diagonal running test yarn course and showing structural features as affected by the Standard Wear Test, FIG. V is a typical photographic plan view (2640X) of an electroless Ni-B alloy/9$\mu$ synthetic diamond "A" composite indicating the running test yarn course and showing structural features as affected by the Accelerated Wear Test, FIG. VI is a typical photographic plan view (250X) of an electroless Ni-B alloy/9$\mu$ synthetic diamond "A" specimen in the as-plated condition (A) and after an Accelerated Wear Test (B), FIG. VII is a typical photographic plan view (250X) of an electroless Ni-B alloy/9$\mu$ natural diamond specimen in the as-plated condition (A) and after an Accelerated Wear Test (B), FIG. VIII is a typical photographic plan view (250X) of an electroless Ni-B alloy/9$\mu$ synthetic diamond "B" specimen in the as-plated condition (A) and after an Accelerated Wear Test (B), FIG. IX is a sectional perspective view of a preferred embodiment of apparatus which is employed to lay down the composite coatings of this invention, FIG. X is a fragmentary, cross-sectional, side elevation view of a multi-filament yarn interlacing air jet which is advantageously coated according to this invention, FIG. XI is an end elevation view, partly in cross section, of a multiplicity of interlacing jets of the design of FIG. X in assembled relationship, and FIG. XII is a section on line XII—XII, FIG. XI.

INTRODUCTION

The prior art is replete with publications teaching the electroplating of metallic-diamond composite coatings; however, it is believed that electroless plating of diamond composites has never been successfully accomplished except, possibly, by the very special technique taught in application Ser. No. 103,355, assigned to common assignee, of which one of the present applicants is a co-inventor. There is, it is true, art on the electroless plating of composites of metals and particulate metal compounds, specifically. British Pat. No. 1,219,813 (corresponding to U.S. Pat. No. 3,617,363); however, there appears to be nothing with respect to particulate diamond.

Applicants' composite laydowns must be distinguished from electroless coating of diamond particles per se with nickel and cobalt, such as taught in U.S. Pat. No. 3,556,839.

Applicants have now discovered a method of concurrently depositing, by the electroless plating technique, as a disperse phase, particulate diamond in composite with Ni(B), Ni(P), Co(B), Co(P) and other metals and metal alloys singly, or as mixtures of any two or more of these substances together, as well as metallic copper as the continuous phase or matrix. The coatings produced are highly adherent, relatively non-porous and possessed of a truly remarkable abrasive wear resistance. In addition, the diamond particle pull-out characteristics, particularly of the synthetic diamond species "A" hereinafter described, are very good, so that objectionable detritus is not carried over into the surrounding environment which could, possibly, act as an abrasive agent to gall or otherwise damage the fine finish of bearings or other metal-to-metal contact surfaces. The combination of properties displayed by the diamond composites of this invention are such that they have great potential value as abrasion-resistant surfaces for both dry and wet service, writing instrument nibs, cutting tool surfaces, piston ring and other sliding contacting surfaces, textile wear surfaces and other extremely demanding uses.

Applicants have prepared composite incorporating, singly, particulate natural diamond and the only two synthetic diamonds which are commercially available at the time of filing, these being denoted synthetic diamond "A," which is explosively formed by applicants' assignee in accordance with the teachings of U.S. Pat. No. 3,401,019, and synthetic diamond "B," which is marketed by the General Electric Company, Schenectady, N. Y., and which is believed to be fabricated in accordance with the teachings of U.S. Pat. Nos. 2,947,608 through 2,947,611, inclusive.

As hereinafter described, the composites of applicant' invention are usually used as relatively thin self-adhered coatings deposited on the surfaces of a substrate consisting of a metal, polymer, ceramic, glass, wood or other relatively rigid material. However, if desired, the composites can be laid down on a temporary substrate, such as thin metal, water-resistant paper, film or foil, polymer sheeting or the like and the coating stripped therefrom (or the temporary substrate melted or dissolved away) and thereafter utilized as a wear-resistant shell per se, which can be adhered to any firm supporting base material which is, in itself, suited to the particular use environment's requirements, by adhesives, cement, heat treatment or in other conventional manner known to the art.

It is practicable to use a very wide variety of substrates and base materials, the only limitation being that inherent in widely different coefficients of thermal expansion as regards the coating with reference to the underlying support material. Filled polymers, such as those incorporating staple fibers as reinforcement, appear to give most satisfactory substrate structures.

Applicants have prepared composite coatings on substrates of unfilled ABS (acrylonitrile-butadiene-styrene copolymer), filled ABS, ABS reinforced with glass fibers and with acicular $TiO_2$, polyimides, polyolefins, polyesters, "Delrin" acetal resins, "Zytel" nylon resins, and "Nomex" aromatic polyamide resins, and, while all have not been tested as thoroughly as some hereinafter described, all have supported coatings that were visually uniform and well-adhered.

Polymers are, of course, especially preferred in moderate temperature corrosive sevice environments, because of their low cost, relatively high resistance to corrosion and low contamination potentiality. On the other hand, where relatively high temperatures exist, or where it is necessary to improve the composite coating properties by heat treatment, metals are preferred, since they survive heating to relatively high temperatures without the warping and compositional deterioration usually suffered by polymers.

THE DEPOSITION PROCESS

The composite deposition process employed in this invention can utilize much of the published electroless plating art.

Thus, for electroless Ni-P min. strike deposition U.S. Pat. Nos. 2,658,841 and 2,658,842 are instructive. Similarly, electroless Ni-B, Ni-Co-B, and Co-B processes are taught in U.S. Pat. Nos. 3,062,666; 3,063,850; 3,096,182; 3,140,188; 3,234,031 and 3,338,726. Also, electroless Co-P and Ni-Co-P processes are disclosed in U.S. Pat. Nos. 2,532,284 and 2,871,142. Finally, electroless copper processes are described in U.S. Pat. Nos. 2,996,408; 3,075,855–6; 3,383,224; 3,431,120; 3,329,512; 3,361,580; 3,392,035; 3,457,089 and 3,453,123.

The electroless Ni-P processes which are the subjects of certain of the Patents cited supra utilize aqueous solutions containing $H_2PO_2^-$ ions, which act as the reducing agent, and nickel ions furnished by dissolved nickel salts. Similarly, the electroless Ni-B processes utilize aqueous solutions of nickel salts and a boron-containing reducing agent, such as $BH_4^-$ ions or dimethylamine borane (DMAB). In addition, workable electroless plating baths contain buffers, e.g., salts of weak carboxylic or dibasic acids, to prevent rapid changes in pH, plus at least one of a large variety of chemical compounds or metallic ions which act as stabilizers preventing spontaneous bath decomposition.

The foregoing mentioned components, and others, are commonly present in electroless plating baths, or are added during plating, for such purposes as: (1) adjustment of pH, (2) complexing of metal cations, (3) surface activity control, (4) bath efficiency control and (5) deposit internal stress control, and these are generally referred to herein as additives facilitating electroless plating per se.

Among the patent references cited supra are several teaching that other metallic or non-metallic elements, including (but not limited to) lead, zinc, thallium and arsenic may be co-deposited with the principal elements Ni, Co and Cu. It is also known that Ni, Cu and P can be collectively co-deposited using a proprietary process of the Shipley Company, Newton, Massachusetts.

More specifically, U.S. Pat. No. 3,140,188 teaches processes by which Ni and Co can be deposited from stable baths containing Zn or Fe, and that the coatings are smooth, adherent and constituted of alloys including: Ni-Zn, Ni-Co-Zn, Co-Fe, and Ni-Fe. Also, U.S. Pat. No. 3,062,666 teaches that a lead salt can be included in the plating bath as a stabilizer, and it has been verified that the Ni or Co plating from the bath of this Patent contains small quantities of Pb, without impairing the smoothness. Similarly, application Ser. No. 847,457, assigned to common assignee, teaches that thallium can be a component of smooth, adherent electroless plates if suitably incorporated in the bath. Moreover, U.S. Pat. No. 3,063,850 teaches that not only Ni and Co but also Cu, Cd and Sn individually can be plated as smooth adherent coatings by electroless plating.

Accordingly, the instant invention is not limited to electroless deposits consisting solely of the metals Ni, Co, Cu and the non-metals P and B, but also comprises these elements singly and plurally, as well as other elements whose presences are tolerable or, indeed, beneficial, as far as bath stability and coating quality are concerned.

Electroless plating is an autocatalytic process, in the sense that the coating which is deposited serves as catalyst for continuation of the plating process. Once plating is initiated on the surface of a metallic, ceramic, polymeric or other substrate, it will continue as long as the article remains in contact with the periodically replenished plating solution. Since no electric current is required for the plating which occurs, the general adjectives "electroless" or "chemical" have been used to differentiate these processes from conventional electroplating.

The diamond particles utilized in this invention can have particulate sizes in the range of from less than about 0.1 to 50$\mu$ or even to 75$\mu$. The quantity of diamonds incorporated in our electroless alloy coatings can range from about 1 to about 50 volume per cent.

The diamond particle shapes employed herein were approximately equi-axed and there appeared to be no optimum particle size distribution. Thus, the diamonds employed in some of the Examples infra consisted of mixtures extending from about 1 to about 22$\mu$ size.

In the plating of electroless alloy-diamond composites according to this invention, a dispersion of diamond articles is maintained throughout the plating bath, so that the particles constantly contact surfaces of the substrates being coated. The plating baths must be properly formulated, controlled and operated as hereinafter described under conditions that prevent initiation of plating on the surfaces of the diamond particles suspended in the bath. Thus, if plating initiates on the surfaces of the suspended particles, the bath will decompose by rapid depletion of the metallic ions and the reducing agent, rendering the bath uncontrollable and useless for further plating. The plated diamond particles which come into contact with the substrates being coated form rough, highly porous, nonadherent, unsightly deposits, which are totally unacceptable. Thus, the object of our invention is completely different from that of U.S. Pat. No. 3,556,839 and also of common assignee's application Ser. No. 847,457, where the intent is to plate the surfaces of the diamond particles suspended in the plating bath.

Metallic substrates are given a conventional preplating treatment, depending on the particular metal or alloy, prior to coating by this invention. Thus, the steel specimens of the Examples infra were first solvent-degreased in trichlorethylene, followed by hot alkaline cleaning (e.g., Enbond S61) at 65° C. for about 5 minutes, after which they were water rinsed, acid-etched in a 50% by volume solution of HCl at room temperature for 30 to 60 sec., and water rinsed prior to immersion in the plating bath.

Plating initiates spontaneously on metallic substrates which are catalysts for electroless plating processes. For example, for baths that deposit nickel alloys, catalytic metals include Co, Ni, Pt and Pd. Plating also initiates spontaneously on metals which are noncatalytic but less noble than the bath metal, because a thin film of the dissolved metal rapidly forms through displacement, and the dissolved metal, being a catalyst, continues the plating process. Examples of this, for electroless nickel processes, are the plating of iron, aluminum, magnesium, beryllium and titanium. Metallic substrates which do not initiate plating spontaneously can be initiated galvanically by brief application of a small negative potential to the substrate.

Nonconducting substrates, such as polymeric organic materials, are prepared for plating by roughening mechanically as by grit blasting (27 micron alumina being suitable), followed by a treatment depositing a suitable catalyst for electroless plating, typically immersion in an $SnCl_2$ solution (70 g/l $SnCl_2$ plus 40 cc/l HCl, 80° F.), water rinsing and immersion in a $PdCl_2$ solution (0.1 g/l $PdCl_2$ plus 1 cc/l HCl, 80° F.) and water rinsing. Pearlstein, in Metal Finishing, Aug. 1955, pp. 59–61, outlines a two-step approach to surface activation using the hereinbefore described $SnCl_2$ predip and $PdCl_2$ activation solution.

Numerous proprietary processes have been developed that combine and simplify the individual steps of the activation procedures. For example: (1) U.S. Pat. No. 3,563,784 teaches the preactivation step of immersing plastic parts in a surfactant solution to insure complete coverage with the electroless deposit of metal; (2) U.S. Pat. No. 3,579,365 teaches the pre-etch preactivation step of treating the polymer surfaces with colloidal or emulsified fatty-acid materials to improve metal adhesion; (3) U.S. Pat. No. 3,562,038 and British Pat. No. 1,212,002 teach two approaches to surface activation using colloidal suspensions of palladium particles prepared by pre-reduction of palladium chloride with stannous chloride. The foregoing processes extend the application of electroless plating techniques to a wide spectrum of polymers, including the polyolefins and polyesters.

Ni, Co PREPLATING TREATMENT

The ABS (i.e., acrylonitrile-butadiene-styrene copolymers), glass fiber-reinforced ABS and acicular rutile fiber-reinforced ABS resins described in the examples infra, which were given a plate and with diamond particles composited with electroless Ni and electroless Ni-Co alloy matrices, were first given the following preplating treatment.

1. Cleaning by immersion in a proprietary alkaline cleaner (e.g., Marbon C-15) for 5 minutes at 65° C., to remove any grease or oil picked up in molding or handling operations.
2. Rinsing in hot and cold water in the sequence recited for 30 secs. each.
3. Chemically roughening to promote coating adhesion by immersion for 4–6 minutes at 65° C. with mild agitation in a proprietary chromic-sulfuric acid etch (e.g., Marbon E-20).
4. Rinsing in, first, hot and then cold water for 30 secs. each, followed by an ultrasonic water rinse of 2 minutes and a final rinse with running deionized water.
5. Sensitizing by immersion in a proprietary (Enplate 432) bath containing tin ions with the parts agitated in the bath.
6. Rinsing twice in de-ionized water for 30 secs. each while agitating gently to remove excess tin ions from the articles.
7. Immersing in a proprietary activation bath (e.g., Enplate - 440) containing Pd ions. The tin ions were here oxidized under gentle agitation for 1.5 minutes, thereupon reducing the Pd ions to metallic state.
8. Finally, rinsing with two separate de-ionized water rinses of 30 secs. duration each while gently agitating.

COPPER PREPLATE

ABS reinforced and unreinforced specimens employed in the examples infra, wherein particulate diamond was composited with an electroless Cu matrix, were given the following preplating treatment:

Steps 1 through 4 supra, then

5. Immersing in MacDermid, Inc. Metex PTH Activator 9070 at room temperature for 8 mins.
6. Rinsing twice in de-ionized water for 30 secs. duration each.
7. Immersing in Metex PTH Accelerator 9071 for 8 mins. at room temperature.

8. Finally, giving the articles two de-ionized water rinses of 30 secs. duration each.

Ceramic substrates are prepared for plating by first mechanical roughening, e.g., grit blasting, or by chemical roughening using an aqueous HF solution to develop anchoring points for the catalyst and for the wear-resistant electroless alloy strike that is subsequently applied.

STRIKE TREATMENT

All of the specimens of the examples (except as described for Ex. 20) were give a 10 to 70 minute plating strike prior to plating in the electroless alloy plating bath containing the diamond dispersion. The strike bath was of the same composition as the composite plating bath, except that it contained no diamond powder. The purpose of the plating strike is to insure that the adhesion of the initial electroless coating applied to the substrate is not adversely affected by abrasive or other action of the dispersed particles contained in the composite plating bath. A plating strike is imperative in plating non-conductors such as polymers, ceramics, wood and glass, the surfaces of which are thereby covered with adsorbed layers or islands of a catalyst initiating electroless plating. However, in the case of metallic substances displaying high activity in the plating bath, e.g., plain C steel, Ni, Co and Pd, the strike can be omitted.

The electroless alloy-diamond composite coatings of this invention can be deposited by a wide variety of plating techniques ranging from simple rack plating, wherein articles are supported by a rack, to barrel plating, wherein the articles are introduced as free bodies into a rotating bath container, which can have its axis horizontally disposed or somewhat inclined. In addition, of course, articles can be tumble-plated as taught in application Ser. No. 103,355 supra.

The diamond powder to be composited (0.5 to 100 gms. as desired) is first blended with about 200 to 400 ml. of the plating bath in a high-speed mixer to break up agglomerates, wet all of the particles and form a concentrated slurry containing a uniform dispersion of particles. The slurry is then slowly added to the plating vessel, where the powder particles are kept in suspension by mechanical agitation and/or bath circulation. The quantity of diamonds maintained in the suspension, while most commonly in the range of 1 to 10 g. per liter of bath, can range up to as much as 40 g./liter, the upper limit being only that the bath must remain sufficiently fluid to be capable of ready agitation and circulation.

In the experiments hereinafter reported as examples, the metallic ions, reducing agent and bath stabilizer were all replenished on a periodic basis as determined by wet or colorimetric chemical analyses for the respective reacting species.

RACK PLATER

One design of apparatus utilized in the preparation of specimens for Examples 6, 7, 8, 19–22, and 26–28, inclusive, was the rack plater shown somewhat schematically in FIG. IX of the drawings.

Referring to FIG. IX, the plating vessel 10 was a glass jar of 9 liters capacity, about 22 cm. inside diameter, which was provided with two annular shelves 11 and 12, fabricated from polytetrafluoroethylene, these shelves being held horizontal by snug frictional through-bore mounting on three upstanding polytetrafluoroethylene posts 16, only two of which appear in the FIGURE.

Shelves 11 and 12 typically measured 13 cm. inside diameter, 20 cm. outside diameter and were 0.6 cm. thick. Upper shelf 11 was apertured at four locations 17 spaced 90° apart circumferentially, each sized to snugly engage a sample approximately 0.635 cm. × 1.52 cm., so that the top and bottom faces were exposed to the plating solution for the simultaneous plating of these two surfaces. Lower shelf 12 was provided on its upper face with a multiplicity of recesses 18, which did not extend all the way through the shelf, these recesses being dimensioned to closely fit the specimens 20, which were snugly set therein, so that only the upper exposed surfaces were plated.

An electric motor-driven stirrer (typically, 350 rpm) provided the bath agitation, the shaft 22 of which was disposed approximately concentric with the longitudinal axis of vessel 10, which stirrer was provided, at its horizontally bent lower end, with an upstanding elliptical paddle 23 having a major axis of 6.25 cm. and a minor axis of 2.5 cm. The dimensions a, b and c denoted in FIG. IX are, typically, 1.90, 2.54 and 7.62 cms., respectively.

EXAMPLES

General details as to the specimens prepared for typical individual examples are provided in the following Tables:

Table 1A

Description of Specimens in Examples on Plating Polymers

| Example Number | Recessed Samples[1] ABS | Recessed Samples[1] FR-ABS | Coupons[2] ABS | Coupons[2] FR-ABS | Blocks[3] ABS | Blocks[3] FR-ABS | Other FR-ABS Parts | Total |
|---|---|---|---|---|---|---|---|---|
| 1 (TPC-40) | 1 | 2 | 3 | 3 | 3 | 3 | 0 | 15 |
| 2 (TPC-32) | 1 | 2 | 5 | 5 | 3 | 3 | 0 | 19 |
| 3 (TPC-39) | 1 | 2 | 3 | 3 | 3 | 3 | 0 | 15 |
| 4 (TPC-36) | 1 | 2 | 3 | 3 | 3 | 3 | 0 | 15 |
| 5 (TPC-46) | 1 | 2 | 3 | 3 | 3 | 3 | 0 | 15 |
| 9 (TPC-33) | 1 | 2 | 5 | 5 | 3 | 3 | 0 | 19 |
| 10 (TPC-34) | 1 | 2 | 5 | 5 | 3 | 3 | 0 | 19 |
| 11 (TPC-28) | 1 | 2 | 5 | 5 | 3 | 5 | 0 | 21 |
| 12 | 0 | 0 | 0 | 0 | 0 | 0 | 2 jet caps | 2 |
| 13 (TPC-35) | 1 | 0 | 0 | 6 | 1 | 1 | 6 venturi units | 15 |
| 14 (RPC-11) | 0 | 0 | 1 | 1 | 1 | 1 | 0 | 4 |
| 15 (TPC-42) | 1 | 2 | 3 | 3 | 3 | 3 | 0 | 15 |
| 16 (TPC-27) | 1 | 2 | 5 | 5 | 3 | 5 | 0 | 21 |
| 17 (TPC-44) | 1 | 2 | 3 | 3 | 3 | 3 | 0 | 15 |
| 18 (TPC-45) | 1 | 2 | 3 | 3 | 3 | 3 | 0 | 15 |
| 23 (TPC-30) | 1 | 2 | 5 | 5 | 3 | 3 | 0 | 19 |

Abbreviations: applicable to Table 1A:

| | |
|---|---|
| TPC - | Tumble-plated composites |
| RPC - | Rack-plated composites |
| ABS: | acrylonitrile-butadiene-styrene |
| FR-ABS: | fiber-reinforced acrylonitrile-butadiene-styrene |

Footnotes:

[1]The recessed-samples contained small diameter holes and slots.

[2]The dimensions of the coupons were 3 × 10 × 19 mm.

[3]The dimensions of the blocks were 8 × 13 × 25 mm.

Table 1B

| Description of Specimens in Examples of Plating Steel | | | | |
|---|---|---|---|---|
| | Number of Specimens Plated | | | |
| Number | Blocks[1] | Yarnline Block[2] | Washer[3] | Total |
| 6(RPC-6) | 11 | 1 | 3 | 15 |
| 7 (RPC-7) | 11 | 1 | 3 | 15 |
| 8 (RPC-12) | 11 | 1 | 3 | 15 |
| 19 (RPC-3) | 2 | 2 | 0 | 4 |
| 20 (RPC-20) | 2 | 1 | 0 | 3 |
| 21 (RPC-21) | 2 | 1 | 0 | 3 |
| 22 | 2 | 2 | 0 | 4 |

[1]Dimensions of rectangular blocks (6 mm × 10 mm × 15 mm)
[2]Dimensions of rectangular yarnline wear block (6 mm × 6 mm × 12 mm)
[3]Dimensions of cylindrical thrust washer: Diameter: 31 mm Height: 9 mm Table 1C

| Weights of Samples Plated | |
|---|---|
| Designation & Material | Individual Weights, grams |
| "TP" samples | 0.6 to 0.9 |
| ABS coupons | 0.60 |
| FR-ABS coupons | 0.65 |
| ABS blocks | 2.6 |
| FR-ABS blocks | 3.2 |
| Steel blocks | 8.1 |
| Steel yarnline wear block | 3.6 |
| Thrust washers | 58 |

Table 1D

| Characteristics of Particulate Solids Incorporated Into Electroless Coatings in the Several Examples | | | | | | |
|---|---|---|---|---|---|---|
| Example Numbers | Diamond or Other Powder | Nominal Size, μ | Nominal Size Range, μ | Maximum[1] Size Limit μ | % Over-size | % Under-size |
| 1,9,14, 15,19,20 | "A" | 9 | 6 - 12 | 14 | ~3** | ~13** |
| 2,10 | natural | 9 | 6 - 12 | 14 | <5** | <20** |
| 3 | "B" | 9 | 6 - 12 | 14 | <5** | <20** |
| 4 | $\alpha$-$Al_2O_3$ | 8 | — | — | — | — |
| 5 | $\alpha$-SiC | 6 | 1 - 10 | None | 20* | 25* |
| 6,8 | "A" | 1 | 0 - 2 | 3 | ~3** | ~13** |
| 7 | natural | 1 | 0 - 2 | 3 | <5** | <20** |
| 11,12,13 | "A" | 3 | 2 - 4 | 5 | ~3** | ~13** |
| 16,17,18 | "A" | 5 | 2 - 8 | None | <10* | <10* |
| 21,25 | "A" | 6 | 4 - 8 | 10 | ~3** | ~13** |
| 22 | "A" | 9 | 6 - 12 | 14 | <5** | <20** |
| 23 | "A" | 17 | 12 - 22 | None | <15* | <15* |
| 24 | $\alpha$-$Al_2O_3$ | 14 | 6 - 21 | 30 | — | — |

[1]No particle exceeded the maximum size limit when one is specified.
**Percentage of number of particles above upper limit of nominal size range (oversize) or below lower limit of nominal size range (undersize).
*Weight per cent of powder above upper limit (oversize) or below lower limit (undersize) of nominal size range.

The plating process utilized in Examples 1–5, inclusive, was identical, except that different types of powders were added to the bath as indicated in the foregoing Table 1D. In each Example a number (typically, 15–19) of molded ABS, glass-reinforced ABS, and acicular rutile-reinforced ABS polymer articles were tumble-plated as taught in application Ser. No. 103,355 supra, which is incorporated herein by reference. (The acicular rutile is a powder produced by the Pigments Department, E. I. Du Pont de Nemours Co., which consists of single crystals of $TiO_2$ measuring about 0.2μ wide × 2 to 3μ long.) The plating was conducted in an inverted frustoconical funnel of included angle 46° measuring 24 cm. in diameter across at the top end and 0.93 cm. across the lower spout end, 25 cm. high, plating solution being circulated continuously through the spout upwardly into the funnel portion with overflow out of the top collected in a surrounding sump. The plating solution velocity was maintained at a high enough rate (typically 4,200 cm. 3/min.) to support the articles being plated and, at the same time, tumble them slowly in a random manner at a rate of 4 to 7 complete inversions per minute. However, the tumble rate is a function of solution supply velocity, part size, weight, shape and other factors, so that it varied somewhat over the several Examples.

Two different sizes of articles to be plated were utilized, these being (1) rectangular coupons measuring approximately 3 mm. × 10 mm. × 19 mm. and (2) rectangular blocks measuring 8 mm. × 13 mm. × 25 mm.

The articles, contained in an open mesh, sieve-like, stainless steel wire basket, were first given the pre-plating treatment hereinbefore described and were then given a strike layer of Ni-B alloy by immersion for about 10 mins. in a 4-liter beaker which contained an electroless Ni-B plating bath (but no diamond particles) of the composition:

The strike bath was maintained at a temperature of 55° C. The sample-containing basket was gently agitated. The specimens, plated with a thin nickel strike, were then dumped from the basket into the plating chamber of a tumble plater of the general design de-

| | |
|---|---|
| Nickel acetate .$4H_2O$ | 50 g/l |
| Sodium citrate .$2H_2O$ | 25 g/l |
| Lactic acid | 25 g/l |
| Dimethylamine borane (reducing agent) | 2.5 g/l |
| Thiodiglycolic acid (stabilizer) | 0.1 g/l |
| Santomerse S (comm'l wetting agent) | 0.1 g/l |
| $NH_4OH$ (in quantity required to maintain pH at 6.5) | |
| Water | Balance |

scribed supra through which was flowed the same plating solution as was used for the strike at a rate of approximately 4,200 $cm^3$/min. and plating was continued for about 1 hr. before any particulate diamond additions. In Examples 1 through 4, in which 8 and 9μ classified size grades of powder (nominal size range 6–12μ) were used, the powder added was furnished in amount sufficient to establish a concentration of suspended particles of 2 gm./liter of plating bath. In example 5, in which a rough 1 to 10$\mu$ size grade of $\alpha$SiC powder was used, the concentration of powder added was increased to 3 gm./liter to establish a concentration of particles in the 6 to 10$\mu$ size range approximately equivalent to that of Examples 1 through 4. A description of the type powder employed in each Example is reported in Table 2. The period of composite plating was approximately 3.5 hours.

Table 2

Description of Powder Added to Tumble Plater

| Example No. | Type | Structure | Particle Size |
|---|---|---|---|
| 1 | synthetic diamond "A" | Fine-grained polycrystalline particles | 9 |
| 2 | natural diamond | Single crystal diamond cubic (ASTM x-ray data card No. 6-0675) | 9 |
| 3 | synthetic diamond "B" | Single crystal diamond cubic (ASTM x-ray data card No. 6-0675) | 9 |
| 4 | $\alpha Al_2O_3$ | Hexagonal (ASTM x-ray data card No. 10-173) | 8 |
| 5 | $\alpha$SiC (types I & III mixed) | Hexagonal (ASTM x-ray data cards No. 2-1463 and 2-1462, respectively) | 1 to 10 |

Metallographic examination of the composite coatings contained in Examples 1–5, inclusive, revealed that they appeared to be nonporous and consisted of a uniform dispersion of the particulate phase in the electroless Ni-B alloy matrix. Quantimet analysis was used in all examples hereinafter described, to determine particulate concentration in the coatings laid down. This employs the Quantimet Image Analyzing Computer marketed by Metals Research, Ltd., Hertz, England, using photomicrographs taken at preselected magnification which indicated, for Examples 1–5, inclusive, that about 10 vol. percent of the composite coatings consisted of particles.

The samples were prepared for metallographic examination as follows:

1. The coated surface was ground flat on 600 grit SiC abrasive papers,

2. Rough polishing was then performed with 6-$\mu$ diamond abrasive on hard-backed Pellon Pan W cloth, 3. Final polishing was then done for a short period with 0.05$\mu$ $Al_2O_3$ abrasive, taking care to avoid grinding through the coating as well as avoiding excessive "rounding," and 4. Photographing at an appropriate magnification for epidiascopic examination using the Quantimet image analyzing system as indicated:

| | |
|---|---|
| Particles | <3$\mu$-photograph at ~1500X<br>3 to 5$\mu$-photograph at ~1000X<br>>6$\mu$-photograph at ~500X |

It was practicable to conduct metallographic examinations successfully on wear test samples prepared as hereinafter described, thereby saving double sample preparation.

The as-plated surfces of the composite coatings were examined with a scanning electron microscope (SEM) at magnifications ranging from 2,000X to 15,000X. Scanning electron photomicrographs, such as FIG. I (6340X), showed the synthetic diamond "A" particles embedded in the composite coatings plated in Example I largely by a nucleation mechanism occurring at a number of different sites for each particle. This is unique to diamond "A," as FIG. II for natural diamond and many other photomicrographs (not reproduced here) for synthetic diamond "B" show.

The reason for enhanced nucleation on synthetic diamond "A" is not fully understood; however, the surface topography of diamond "A" is so much rougher than that of natural diamond, and diamond "B," also, that it is believed this has a significant effect. Thus, referring to FIG. I, diamond "A" is seen to have recessed growth ledges (1), craters (2), upstanding growth projections (3) and a multitude of other irregularities which appear to present optimum sites for the nucleation of Ni-B alloy grains (4) on the diamond surface per se. In addition, there exists a complete ring of Ni-B nucleated grains around the edge of the diamond "A" particle. The smooth, quite uniform Ni-B grain matrix existing outwards from the diamond particles is relatively continuous and depressed for all of the diamond particles, regardless of type.

Diamond "A" particles have a fine-grained polycrystalline structure, being made up of a multitude of contiguous diamond crystallites tightly bonded directly to one another in an essentially unoriented pattern. The microstructure of diamond "A" is characterized by a bimodal crystallite size distribution, single coherent particles containing a population of very small, blocky, variously oriented crystallites, typically having diameters in the 10–40 A range, interspersed with much larger blocky, unoriented crystallites, typically having diameters in the 100–1600 A range, and mean diameters in the 200–600 A range, as described in Belgian Pat. No. 735,374 the Jl. Applied Physics, Vol. 42, pp. 503–510 (1971). The surfaces of these particles are irregular and of relatively large area, e.g., a specific surface area of about 2 sq. meters/gm., ideal for promoting nucleation of the matrix metal thereon.

Nucleation of Ni-B grains on the diamond "A" surfaces is evidence that chemical bonds form between the diamond and the alloy grains. In addition, the Ni-B alloy grains cover all, or at least a major portion of, the diamond surface, including under and around projections, and around ledges, affording enhanced keying retention of the diamond particles in the alloy.

Referring to FIG. II (6480X) for natural diamond, the sparseness of nucleation (3) is clearly apparent, there being only a single small nucleation growth at about 3 o-clock position. Thus, applicants' research has shown that there is little or no nucleation growth with respect to natural diamond and diamond "B," except where the plating bath is on the verge of decomposition, under which conditions the nucleation frequency is greatly enhanced. When a plating bath can be operated under conditions approaching bath decomposition, then plating can nucleate at many sites, even on particles such as natural diamond and diamond "B," as they are incorporated into the coating. (Refer Examples 26, 27, 28.)

Since natural diamond and synthetic diamond "B" both have a single crystal structure, there are few crystal growth defects, such as stacking faults, or macroscopic growth defects, such as ledges or projections. SEM examination of the type represented by FIG. II, reveals tht both natural diamond and diamond "B" are characterized by diamond surfaces which appear to be smooth and flat and possessed of few ledge type defects. These smooth surfaces appear to be cleavage planes of the diamond cubic system. Encapsulation of the natural and diamond "B" particles takes place by outward growth of Ni-B alloy grains from the catalytic sites of the original substrate until they overlie the diamond, after which lateral growth of the Ni-B alloy grains proceeds along with continued outward growth. This type of growth can be confirmed, since at times, after diamond laydown, one can, typically, observe, below the level of the growing Ni-B alloy grains, a smooth diamond surface about 1–5$\mu$ diameter remaining of the original diamond particle expanse of about 9$\mu$. This clearly indicates the lateral growth of the Ni-B alloy grains slowly covering the smooth diamond surfaces simultaneously with the continued outward growth of the Ni-B grains.

Similarly, the typical structures shown in FIG. II for Example 2 has been found to exist also in Ni-P composites incorporating natural diamond particles.

It should be understood that the nucleation and growth of electroless alloy grains on catalytic surfaces is completely different from that occurring with electrodeposited coatings. Since nucleation and growth of metal or metal alloy grains depends, in electroplating, upon the discharge of metal ions at a conductive surface and, since diamond is non-conductive, there can be no chemical bonding, only physical entrapment of diamond in an electrodeposited matrix. In addition, the inclusion of non-conductive diamond particles in an electrodeposited matrix results in shielding of some metallic areas from any applied potential. The shielded areas will either not plate at all, or will at least plate at a slower rate than non-shielded areas, depending upon the degree of shielding, which results in voids in the coating. Voids do not occur in an electroless alloy/non-conductive particle coating as long as there is suitable solution agitation and movement of the article being plated. This movement and agitation affords fresh metallic ions and reducing agent ingress to all surfaces, at the same time voiding gaseous reaction products as deposition proceeds.

An extremely important plating variable which requires control is stabilizer concentration, and this is particularly true for diamond "A."

In general, the stabilizer concentration must be high enough to prevent spontaneous decomposition of the plating bath as well as prevent nucleation of plating on the surfaces of the diamond particles suspended in the bath. However, if stabilizer concentrations is too high, nucleation of plating on the diamond "A" particles that come into contact with, and are incorporated in, the coating being deposited will be stifled. Indeed, excessively high stabilizer concentrations poisons the electroless plating reaction completely, even on a metalic surface which is normally a catalyst for electroless plating, preventing the formation of any coating whatever.

Experiments 16, 17, and 18 hereinafter reported, utilizing an electroless Ni-B process stabilized with thiodiglycolic acid (TDGA), show that the nucleation of plating on diamond "A" particles is significantly inhibited at stabilizer concentrations below those which completely poison the plating reaction on the metallic matrix phase. Therefore, to achieve the unique attachment of diamond "A" particles in the plating of electroless composite coatings, the stabilizer concentration must be much more carefully controlled than in conventional electroless plating. It is best practice, in the electroless plating of diamond "A," to determine, by experiment, the optimum stabilizer concentration for each individual plating process as well as for each individual bath stabilizer employed.

Other plating variables which affect the nucleation of plating on all diamond types are pH, bath temperature and reducing agent concentration. For each electroless alloy process, these variables must be carefully controlled to achieve nucleation at multitudinous sites on the diamond particles as these are incorporated into the composite coating while, at the same time, preventing plating on the particles suspended in the bath.

For the electroless Ni-B process of Example 1, the operating temperature limits within which the desired nucleation will occur are relatively broad, ranging from about 50° C. to about 80° C. At a temperature of above about 80° C., plating starts to initiate on the diamond particles suspended in the bath, causing it to decompose. On the other hand, at temperatures below about 50° C. nucleation of plating is substantially inhibited. In addition, the effect of temperature on abrasive wear resistance is shown by Examples 1 and 15. Thus (Example 15), in a highly accelerated yarn line wear test, an electroless Ni-B/9$\mu$ diamond "A" coating deposited at 40° C. (i.e., 10° below the minimum level for best results), where nucleation on the particles is stifled, had a wear rate of 9.6$\mu$/hr. A comparable coating plated by the same process at 55° C. (Example 1), where abundant nucleation occurs on the incorporated diamond particles, had a wear rate of only 5.1$\mu$/hr.

Some of the SiC particles in the coating of Example 5 showed evidence of plating nucleation, but the number of nucleation sites per particle was much less than that on diamond "A," Example 1.

WEAR TESTING

Since one very demanding abrasive service is yarn line processing, two coating wear tests were developed using running yarn lines as the abrading agents, the Standard Test being conducted with dry yarn, whereas the Accelerated Test employed a yarn wet with an abrasive slurry.

The specimens used in these tests consisted of coupons measuring about 0.5 mm. wide cut from plated rectangular blocks measuring about 8 mm. × 13 mm. in cross-section.

The procedure (Technique R) utilized for preparation of coated polymer test specimens was as follows:

1. Sample mounted, in duplicate, in "Quick Mount" quick-setting mounting resin.
2. Coated block sections with a hack saw perpendicular to the long axis of the specimen.
3. Grind hack-sawed edge successively on 240, 400 and 600 grit SiC abrasive papers, turning the specimen 90° between steps,
4. Rough-polish the hack-sawed edge with 6$\mu$ diamond abrasive on a hard-backed Pellon Pan W cloth,
5. Final-polish the hack-sawed edge with 0.05$\mu$ gamma $Al_2O_3$ on a soft Micro-Cloth cloth,
6. Using a hacksaw cut approximately a ⅛ inch slice from this mount parallel to the hack-sawed edge,
7. Mount this ⅛ inch slice on a stainless steel block with two-sided tape, with the previously polished surface next to the block,
8. Grind down outboard face to approximately 22 mils thickness with 240 grit abrasive paper,
9. Repeat steps 3 through 5, bringing to a final thickness of 18–20 mils, and 10. Remove the specimen from the stainless steel block using ethyl alcohol or a similar solvent to soften the tape without damaging the base material, and carefully peel the mounting medium from the test piece.

The procedure (Technique S) utilized for preparation of coated metallic wear test specimens was as follows:

1. Carefully clamp the coated metal specimen in a small, portable, precision vice for sectioning with a wafer machine, 2. Align the vice so that the specimen long axis is perpendicular to the SiC cutting wheel, 3. Slowly cut with two edge cuts to give a 30 mil slice from the block, 4. Follow steps (3)–(5), inclusive, of Technique R for both cut edge surfaces. Final thickness should be 18–20 mils, and 5. Etch in ethyl alcohol plus 4 vol. per cent $HNO_3$ for 2–5 secs. to delineate the coating-substrate interface.

The front and back surfaces of the test pieces were so smooth and polished that 250X photomicrographs could be taken before and after testing in order to evaluate the amount of wear. Photomicrographs were also taken in plan of the surface of the coatings before and after wear testing to distinguish between a valid test, where the wear track extends across the entire width of the coating, and an invalid test, where corner notching occurring at the front and/or back edges is the result of localized edge cutting and the central part of the wear track remains essentially untouched.

Both Tests employed the same general apparatus, shown schematically in FIGS. IIIA–IIIC, except that only the Accelerated Test used the slurry nozzle denoted at 28.

Test specimens were clamped in position during testing in a holder, not shown, which was provided with sets of vertical ceramic pins in front of and back of the specimen, which pins defined a vertical slot normal to the width of the specimen about 0.25 mm. wide through which the yarn line 29 ran. The yarn is drawn from a bobbin (not shown) on the left side of FIG. 111A and is trained through "pig tail" ceramic guides 30, through two sets of tensioning disks 31a and 31b, and thence under a 3.2 mm. diameter horizontal ceramic pin 32 located 35 mm. in front of the central axis of the specimen 33. The yarn line next runs across the top coated surface 33a of the specimen and leaves at a slight downward angle by transit under 3.2 mm. diameter horizontal pin 35 located 35 mm. downstream from the central axis of the specimen. The vertical position of the specimen can be adjusted by elevating screws or the like, not shown, to preselect the break angle between running yarn 29 and the horizontal plane of coated surface 33a.

STANDARD WEAR TEST

The Standard Test conditions adopted in Application Ser. No. 103,355 supra were used, these being as follows:

| | |
|---|---|
| Yarn: | 15-denier monofilament, full dull nylon (Code designation 15-1-0-680D) (Merge designation 15261) |
| Yarn Tension: | 10 gms. |
| Yarn Speed: | 1000 yds./min. |
| Break Angle: | 5° |

Wear Rate in microns per hour was defined as the average depth of the normal wear groove N, i.e., the sum of the wear grooves measured in front, df, and back, db, respectively, divided by 2, the whole divided by the test time in hours, as diagrammed for the lower test track, FIG. IIIE. (Very accurate measurements of the wear tracks were made from leading and trailing side elevation (i.e., edge-on) photomicrographs under high magnification both before and after each wear test.) Under the test conditions described, the electroless Ni-P alloy with 9$\mu$ diamond "A" composite coatings exhibited surface polishing but no measurable wear even after 8 hours of continuous testing.

Increasing the severity of the test by increasing the tension to 15 gms. and the break angle to 10° did result in some moderate localized edge cutting (M) of the Ni-B diamond "A" composite coatings after 24 hours continuous testing; however, none of the tests were valid because the central regions under the yarn track were observed to be essentially unmarked (refer upper test track, FIG. IIIE). The notches (M) cut in the edges of the coatings were examined by scanning electron microscopy to ascertain differences in wear mechanisms for comparable electroless alloy composite coatings with different types of diamonds, the results of which are hereinafter reported for individual Examples.

ACCELERATED WEAR TEST

An Accelerated Wear Test in which aqueous slurries of abrasive particles were applied to running yarn line 29 was developed to obtain quantitative wear measurements on our electroless alloy diamond composite coatings. This utilizes a slurry applicator 28 between tensioning disks 31a, 31b and the first ceramic pin 32 as shown in FIG. IIIA, i.e., 14.9 cm. ahead of the center line of specimen surface 33a.

Applicator 28 was provided with an axial bore 28a measuring 0.508 mm. dia. which opened into a vertical-sided end notch 28b 3.18 mm. long, as measured in a horizontal plane in the direction of yarn line travel. The base surface of notch 28b was a convex arc of radius 1.58 mm. drawn from the vertical axis of the applicator. The upper inner edges of notch 28b were beveled outwardly at slopes of 40° measured from the vertical. The yarn line traversed the orifice 28a diametrically at zero break angle, making essentially tangent contact with the orifice lips. An abrasive slurry of oxide particles dispersed in water was pumped through applicator 28 and metered onto the yarn line. Initial scouting experiments were conducted with slurries of 20 wt. per cent pigmentary $TiO_2$. Subsequent work indicated that the severity of wear obtained with slurries of 15% Linde A, $\alpha$-$Al_2O_3$, was much greater. The relative severities of the tests run are compared in Table 3, as to which the material tested was Vasco 7152, a tool steel customarily used in the textile industry for severe abrasive wear applications. Wear rate is expressed in terms of depth of groove cut per unit time, i.e., $\mu$/hr., into the uncoated steel coupon.

Table 3

YARNLINE COMPARATIVE WEAR TEST SEVERITY

Material Tested: Vasco 7152 Tool Steel
Yarn: 15-denier, monofilament full dull nylon
Yarn Speed: 1000 yds./min.
Abrasive Slurry Feed Rate: 2.8 ml./min. for Test No. 3 and 2.5 ml./min. for Test No. 2.

| Test | Yarn Tension | Yarn Break | Abrasive | Wear Rate, |
|---|---|---|---|---|

Table 3-continued

| YARNLINE COMPARATIVE WEAR TEST SEVERITY | | | | |
|---|---|---|---|---|
| No. | gms. | Angle(Degs) | Slurry | μ/hr. |
| 1 | 15 | 10 | None | 2.4 |
| 2 | 10 | 10 | 0.7μ $TiO_2$ in $H_2O$ (conc'n 20 wt. %) | 280 |
| 3 | 10 | 5 | 0.3μ$Al_2O_3$ in $H_2O$ (conc'n 15 wt. %) | 1450 |

Under the circumstances, the conditions of test No. 3 were selected for the Accelerated Wear Test for quantitative evaluation of the electroless alloy diamond composite coatings. This test is severe enough to cut grooves, or at least leave visible traces, in diamond composite coatings which extend across the entire width of the test samples, thereby permitting valid quantitative wear rate determination. The test is also severe enough to rapidly cut grooves in high density bult $Al_2O_3$.

A comparison of accelerated yarn wear test results for five electroless Ni-B composite coatings containing particles about 9μ dia. of $Al_2O_3$, SiC and three different types of diamonds, Examples 1–3, respectively, is reported in Table 4. All of the coatings reported were plated by the tumble plating process of application Ser. No. 103,355 supra. Each contained about 10 vol. per cent of the particulate phase dispersed in the electroless Ni-B alloy matrix.

Table 4

| ACCELERATED YARNLINE WEAR TEST RESULTS Test Conditions: Same as Test No. 3 in Table No. 3 with a slurry feed rate of 2.8 ml./min. | | | |
|---|---|---|---|
| Example No | Material | Test Time, min. | Wear Rate, μ/hr. |
| 1 | Electroless Ni-B/9-μ Diamond "A" Composite Coating | 85 | 5.1 |
| 2 | Electroless Ni-B/9-μNatural Diamond Composite Coating | 85 | 10.2 |
| 3 | Electroless Ni-B/9-μ Diamond "B" Composite Coating | 85 | 13.1 |
| — | Bulk 99.5% $Al_2O_3$ (Alsimag 785) | 30 | 57 |
| 4 | Electroless Ni-B/8-μ $Al_2O_3$ Composite Coating | 9 | 109 |
| 5 | Electroless Ni-B/1–10μ SiC Composite Coating | 5 | 278 |
| — | Vasco 7152 Tool Steel | 20 | 1,450 |
| — | Electroless Ni-B As-plated (with no particles) | 1/30 | 23,000 |

From Table 4 it can be seen that the three electroless Ni-B diamond composite coatings are approximately a factor of 8 to 20 times more wear-resistant than the Ni-B $Al_2O_3$ composite coating and approximately a factor of 20–55 times more wear-resistant than the Ni-B(SiC) composite coating. The rate of abrasive wear for the electroless Ni-B 9μ diamond "A" is approximately a factor of two less than that of the comparable composites with natural diamond or diamond "B." The superior wear resistance of electroless alloy diamond "A" composite coatings demonstrated is attributable to the strong chemical bond formed between the diamond "A" particles and the electroless alloy matrix due to extensive nucleation of plating on the diamond as hereinbefore described.

The effect of particle size and volume loadings on yarnline wear resistance for electroless diamond composite coatings is apparent from Table 5.

Table 5

| EFFECT OF PARTICLE SIZE AND VOLUME LOADING ON YARNLINE WEAR RESISTANCE | | | | |
|---|---|---|---|---|
| Coating Matrix: | Electroless Ni-B alloy deposited by process cited in Example 1. | | | |
| Dispersed Phase: | Explosively formed diamond "A" | | | |
| | Dispersed Phase Data | | Wear Test Data | |
| Example No. | Average Particle Size, μ | Volume, % | Time, min. | Rate, μ/hr. |
| 23 | 12–22 | 16 | 85 | 3.4 |
| 1 | 9 | 10 | 85 | 5.1 |
| 16 | 5 | 20 | 85 | 6.2 |
| 13 | 3 | 29 | 30 | 11.6 |
| 11 | 3 | 5 | 10 | 65 |
| 8 | 1 | 20 | 2 | 216 |

For the electroless Ni-B composite coatings of Examples 16, 13 and 8 the rate of abrasive wear increases from 6.2μ/hr. to 216μ/hr. as the average particle size decreased from 5μ to 1μ. The wear resistance of the coatings with particles about 3μ diameter is very sensitive to volume loading, as indicated for Examples 11 and 13. The yarnline resistance for other types of wear-resistant particles exhibit the same trends (directly proportional to the loadings) with respect to the effects of particle size and volume loading.

EXAMPLES 6 AND 7

Examples 6 (synthetic diamond "A") and 7 (natural diamond) illustrate the differences in yarnline wear resistance of electroless Ni-P alloy composite coatings containing 1μ diamond "A" and 1μ natural diamond particles, respectively. In these experiments plain carbon steel blocks were rack-plated in the apparatus of FIG. IX hereinbefore described.

The fifteen steel blocks ranged in size from 6 mm. × 10 mm. × 15 mm. to 6 mm. × 6 mm. × 12 mm. These were given the conventional preplating treatment for steel supra, and then immersed for 30 mins. in a Cuposit NL-63 electroless Ni-P plating bath maintained at 85° C. contained in the apparatus 22 cm. dia. jar. The blocks were disposed on lower shelf 12, permitting coating of top and side surfaces; however, only the top coating was wear-tested.

Then a slurry containing a preselected one of the types of particulate diamonds supra in concentration to finally give 4 gms. of powder per liter was slowly added. The stirrer was operated at 350 ± 10 rpm to maintain a good powder dispersion in the plating bath and the composite Ni-P alloy-diamond composites were laid down for 3.5 to 4 hrs.

Specimens rack-plated as described contain a higher volume per cent of the diamond particulate phase in the horizontal top surface coating than on the sides, and this was the surface chosen for wear testing because the dispersion was most uniform.

Metallographic examination of the composite coatings of Examples 6 and 7 showed that both possessed a uniform dispersion of diamond particles in the Ni-P alloy matrices. Quantimet analyses of photomicrographs at 1800X showed that the composite coatings contained about 20 volume per cent of particulate diamond.

Results of accelerated yarnline wear tests conducted identically with Examples 1 through 5 supra were as follows:

Table 6

| Example No. | Composite Coating | Test Time, Minutes | Wear Rate, μ/hr. |
|---|---|---|---|
| 6 | Electroless Ni-P/1μ diamond "A" | 2 | 378 |
| 7 | Electroless Ni-P/1μ natural diamond | 2 | 732 |

Comparison of Example 6 with Example 7 shows that diamond "A" in Ni-P matrix is superior to natural diamond in the same matrix.

EXAMPLE 8

Fifteen steel blocks were rack-plated with an electroless Ni-B alloy composite coating containing one μ diamond "A" by the same technique as employed for Examples 6 and 7, except that an electroless Ni-B bath of the type of Example 1 was used. The blocks were given a strike for 20 mins. before diamond addition.

The particulate diamond "A" (1μ size) was slowly added in an amount establishing the final diamond concentration of the bath at 4 gm./liter, and composite plating was conducted at 55° C. for 4 hrs.

Again, metallographic examination of the top horizontal surface of the blocks confirmed that there was a uniform diamond dispersion, and Quantimet analysis indicated a 20 volume per cent diamond loading.

In a 2 minute accelerated wear test, conducted under identical conditions as Examples 1, 6 and 7, the measured wear rate was 216μ/hr.

It was concluded that the Ni-B composite of Example 8 was appreciably superior to the Ni-P composite of Example 6.

EXAMPLES 9 and 10

These examples illustrate the differences in yarnline wear resistance as a function of diamond type.

Examples 9 and 10 were, respectively, Ni-P alloy/9μ diamond "A" and Ni-P alloy/9μ natural diamond composites laid down on polymeric substrates.

For each Example, three blocks and five coupons were prepared from ABS polymer, and the same from fiber-reinforced ABS. The blocks measured 8 × 13 × 25 mm. and the coupons 3 × 10 × 19 mm. All pieces were tumble-plated as hereinbefore described for Example 1.

All specimens were given the preplating treatment hereinbefore described for ABS resins and were then coated as follows:

1. 10 mins. of electroless Ni-P strike in a Cuposit NL-61 bath maintained at 65° C. in a 4-liter beaker,
2. 60 mins. of tumble plating in a Cuposit NL-61 electroless Ni-P bath maintained at 65° C. in a tumble plater of the general design taught in application Ser. No. 103,355 supra, and
3. 2.5 to 3 hrs. of composite tumble plating in Cuposit NL-61 bath at 65° C. containing a dispersion of 2 gm./liter of 9μ diamond particles.

Metallographic examination of both types of the composite coatings showed them to be possessed of a uniform dispersion of particulate diamond in the electroless Ni-P alloy matrices. Quantimet analysis at 750X revealed a particulate phase content of 23 volume per cent.

Scanning electron photomicrographs of the surfaces of the composite platings of the Examples showed that there was extensive nucleation of plating at multitudinous sites on the diamond "A" particles of Example 9, whereas no nucleation was found in the case of the natural diamond.

The results of accelerated yarnline wear tests on the composite coatings are reported in the following Table 7, which also includes Vasco 7152 tool steel as a comparison.

Yarn: 15-denier monofilament dull yarn
Yarn Speed: 1000 yds./min.
Yarn Tension: 10 ± 2 gms.
Yarn Break Angle: 5°
Abrasive Slurry: 15 wt. % Linde A $Al_2O_3$ in $H_2O$
Slurry Feed Rate: 2.4 ± 0.2 ml./min.

Table 7

| Example No. | Composite Coating | Test Time, Minutes | Wear Rate, μ/hr. |
|---|---|---|---|
| 9 | Electroless Ni-P/9μ diamond "A" | 90 | 3.3 |
| 10 | Electroless Ni-P/9μ natural diamond | 80 | 7.5 |
| | Vasco 7152 Tool Steel | 20 | 1040 |

Conclusion: Diamond "A" is definitely superior as regards wear resistance.

EXAMPLE 11

Rectangular blocks and coupons of molded ABS and fiber-reinforced (some glass fiber and some acicular rutile employed singly) ABS resins were given the polymer pretreatment hereinbefore described for ABS resins and were then coated by the following procedure:

a. 10 minute strike in a 4-liter beaker by the electroless Ni-B process of Example 1,
b. 1 hr. of tumble plating by the electroless Ni-B process of Example 1 in a bath free of particle additions, and
c. 3 hrs. of composite tumble plating by the electroless Ni-B process of Example 1 in a bath containing a dispersion of 2g./l. of 3μ diameter diamond "A" particles.

Metallographic examination of the composite coating obtained confirmed that it was non-porous and possessed of a uniform dispersion of the diamond particles in the Ni-B alloy matrix. Quantimet analysis of photomicrographs taken at 500X showed a particulate phase loading of about 5 volume per cent. Scanning electron photomicrographs of the surface of the composite coating showed evidence of the nucleation of plating at a multitude of sites on individual incorporated diamond particles.

In a 10 minute accelerated yarnline wear test conducted under conditions identical to those described for Examples 1 through 5 the wear rate was 65μ/hr. Refer to Table 5 for comparative performance.

EXAMPLE 12

Referring to FIGS. 9 and 10 of U.S. Pat. No. 3,279,164, there is shown a yarn processing jet which comprises two mating portions, a "cap" and a "body," which are separable for convenience in stringing up yarn, disassembly taking place at approximately section 10—10, FIG. 9, with the cap itself resembling the design of FIG. 10. The cap was machined from a block of ABS resin filled with 15% of acicular rutile.

The cap was tumble-plated to give an electroless Ni-B/3μ diamond "A" composite coating by the procedure employed in Example 11, except that, in order to obtain only a thin coat, the deposition time was decreased to 80 minutes. Upon inspection under a low power microscope, it was observed that the narrow passageways in the cap were plated similarly to the flat faces which, of course, is important, because the major wear occurs in the passageways.

A test was made using this plated cap in the processing of 18 denier, three-filament nylon yarn running at a rate of 400 yds./min. for a period of 1 hour. No observable effect was noted on the quality of yarn twisted in this jet as compared with a normal tool steel jet. Inspection of the passageways of the cap after the test completion failed to reveal any evidence of abrasive wear.

Scanning electron photomicrographs of the surface of the composite coating showed evidence of nucleation of plating at numerous sites on the individual incorporated diamond particles.

The utility of the composite coating in this practical application was thus demonstrated.

EXAMPLE 13

Two jet venturi units of the design disclosed in U.S. Pat. Nos. 2,852,906, 3,545,057 and 3,577,614 were machined from molded, acicular rutile-reinforced ABS rods. The jet venturi units, plus an assortment of molded ABS and fiber-reinforced ABS rectangular blocks and coupons, were simultaneously plated with an electroless Ni-B composite coating containing 3$\mu$ diameter diamond "A" by the following process:

All articles were first given the hereinbefore described preplating treatment for ABS resins and were then coated as detailed:

a. 10 min. strike in a 4-liter beaker by the electroless Ni-B process of Example 1.

b. 1 hr. of tumble plating by the electroless Ni-B process of Example 1 in a bath free of particle additions, and c. 2.67 hrs. of composite tumble plating by the electroless process of Example 1 in a bath containing a dispersion of 8 gm./liter of 3$\mu$ diamond "A" particles.

Metallographic examination (200X) of the composite coatings confirmed that the coating was non-porous and possessed of a uniform dispersion of diamond particles in the electroless Ni-B alloy matrix.

Quantimet analysis of photomicrographs taken at 1000X magnification indicated that the coatings contained about 29 volume per cent of particulate diamond. Scanning electron photomicrographs of the surfaces of the composite coatings showed evidence of nucleation of plating at multitudinous sites on individual incorporated diamond particles.

In a 30 minute accelerated yarnline wear test conducted as described for Examples 1 through 5, inclusive, the wear rate on the electroless Ni-B/3$\mu$ diamond "A" coating was 11.6$\mu$/hr.

The two polymeric jet venturi units plated with electroless Ni-B/3$\mu$ diamond "A" composite coatings were assembled into completed jets. Other jets were assembled with acicular rutile-reinforced ABS venturi units plated with electroless Ni-B alloy as taught for Example 1.

All of the jets were subjected to processing 70 (total denier)/34 (number of filaments) Type 56 and 70/50 Type 62 polyester yarns. The yarn wore completely through the coating on the inner surfaces of the venturi units plated with electroless Ni-B alloys (without diamond) after less than 80 hrs. of processing. The inner surfaces of the venturi units plated with the electroless Ni-B/3$\mu$ diamond "A" coating showed no signs of abrasive wear after 150 hrs. of continuous processing.

EXAMPLE 14

This example illustrates the unique attachment between explosively formed diamond "A" and an electroless Cu matrix deposited by McDermid, Inc.'s Metex RS Copper 9055 process.

Molded rectangular blocks of ABS and fiber-reinforced ABS resins were given the preplating treatment hereinbefore described for nonconducting substrates generally and were then immersed in an electroless Metex RS copper 9055 bath maintained at 50° C. in a 4-liter beaker. The blocks, which were suspended from copper wires, were positioned about 5 cm. from the bottom of the beaker at locations spaced around the periphery. Plating of electroless copper (free of diamond particles) ensued for about 1 hr. Then a slurry of plating bath plus a sufficient quantity of 9$\mu$ dia. diamond "A" particles to establish a concentration of 2 gm. powder/liter of plating bath was added to the beaker. The plating bath was agitated with a powdered stirrer operated at a speed sufficient to keep the powder particles in suspension. Composite plating in the presence of diamond particles was conducted for 5 hrs.

The resulting Cu/9$\mu$ diamond "A" composite showed moderate nucleation of copper grains with the diamond "A." The copper matrix was composed of 1 to 4$\mu$ grains which displayed a crystal-like growth mechanism, i.e., all surfaces intersected at the same angles, which appeared to be approximately 90°. The nucleated copper grains on the 9$\mu$ diamond "A" particles displayed the same type of crystal-like growth mechanism as the copper grains in the matrix. Copper grains as small as 0.4$\mu$ were observed on the diamond "A" particles, thus being similar to Ni-B grains nucleated on 12$\mu$ diamond "A" particles (refer FIG. I).

It was thus demonstrated that a copper-diamond composite could be made which is at least superficially as uniform as the nickel(B)alloy-diamond composites. Also, since the nucleation was similar in extent, the diamond "A" particles appeared to be well-anchored.

EXAMPLE 15

This example illustrates the effect of plating bath temperature on the nucleation of plating on explosively formed diamond "A" particles incorporated into electroless alloy composite coatings, and on the wear resistance of these coatings.

Electroless Ni-B alloy composite coating containing 9$\mu$ dia. diamond "A" particles were plated by the process of Example 1, except that the bath temperature was decreased from 55° to 40° C.

Rectangular blocks and coupons of molded ABS and fiber-reinforced ABS resins were first given the hereinbefore described pretreatment required for ABS resins and were then coated as follows:

a. 10 min. strike in a 4-liter beaker by the electroless Ni-B process of Example 1 at 55° C., b. 1 hr. of tumble plating by the electroless Ni-B process of Example 1 at a temperature decreasing from 45° C. to 40° C., at the end, and c. 3.75 hrs. of composite tumble plating by the electroless Ni-B process of Example 1 in a bath containing 2 gm./liter of 9$\mu$ dia. diamond "A" particles, the bath being maintained at 40° C.

Metallographic examination of the composite coatings confirmed that the coatings were possessed of a uniform dispersion of 9μ dia. diamond particles in the electroless Ni-B alloy matrix. Quantimet analysis of photomicrographs taken at 500X of the surfaces of the composite coatings showed approximately 9% concentration of particulate phase.

Scanning electron photomicrographs of the surfaces of the composite coatings showed nucleation of plating on only about 10% of the diamond particles incorporated therein, and these particles had only one or two nucleation sites per particle.

In accelerated yarnline wear tests conducted as described for Example 1, the wear rate on the electroless Ni-B/9μ diamond "A" composite coatings plated at 40° C. was 9.6μ/hr. This wear rate is almost a factor of two greater than that for a comparable Ni-B/9μ diamond "A" composite coating plated at 55° C., which exhibits nucleation of plating on multitudinous sites around each diamond particle.

EXAMPLES 16, 17 and 18

These examples illustrate the effect of stabilizer concentration and plating bath temperature on the nucleation of plating on diamond "A" particles incorporated into electroless alloy composite coatings, and on the wear resistance of these coatings. In these experiments electroless Ni-B alloy composite coatings, each containing a range from about 2 to 8μ diameter diamond "A" particles were plated as in Example 1 at stabilizer concentrations of thiodiglycolic acid (TDGA) ranging from 0.10 to 0.20 gm./liter and a temperature ranging from 50° to 55° C. as indicated in Table 8.

Rectangular blocks and coupons of molded ABS and fiber-reinforced ABS resins were given the standard polymer ABS pretreatment hereinbefore described and then coated as follows:

a. 10 min. strike in a 4-liter beaker by the electroless Ni-B process of Example 1, b. 15 to 60 mins. of tumble plating using the bath composition of Example 1, except as modified in Table 8 infra in a bath free of particle additions, and c. 3 to 4 hrs. of composite tumble plating using the bath composition of Example 1, except with 2 gm./liter of the 2 to 8μ dia. diamond "A," and excepting also as modified in Table 8 infra.

Table 8

BATH COMPOSITIONS AND CONDITIONS

| Example No. | Stabilizer Content | TDGA Conc., gm./liter | Temp °C. | Plating Rate, μ/hr. |
|---|---|---|---|---|
| 16 | Standard (same as Example 1) | 0.10 | 55 | 5.3 |
| 17 | High TDGA, otherwise same as Example 1 | 0.20 | 55 | 4.6 |
| 18 | High TDGA and low temperature, otherwise same as Example 1 | 0.20 | 50 | 2.9 |

The coatings of Examples 16, 17 and 18 were possessed of a uniform dispersion of diamond particles in the electroless Ni-B alloy matrix, as determined by metallographic examination. Quantimet analysis showed approximately 20 volume per cent of particulate phase in the composite layers.

The results of accelerated yarnline wear tests on the composite coatings and observations made during SEM examination are listed in Table 9. The wear test conditions were identical to those for Examples 1 through 5. SEM photomicrographs of the composite coatings plated in baths with high TDGA concentration (i.e., Examples 17 and 18) show no evidence of nucleation at a multitude of sites on the diamond "A" particles. These coatings exhibited a significantly higher wear rate than composite coatings deposited in the standard bath at a TDGA concentration of 0.10 gm./liter, i.e., Example 16.

Table 9

| Example No. | Stabilizer Content | Scanning Electron Microscopy Observations on Composite Coatings | Weat Test Data: Time, Mins. | Weat Test Data: Wear Rate, μ/hr. |
|---|---|---|---|---|
| 16 | Standard | Majority of diamond particles incorporated nucleated plating at a multitude of sites on their surfaces. | 85 | 6.2 |
| 17 | High TDGA | Only about 10% of the particles incorporated had nucleation, and these had only one or two nucleation sites per particle. | 85 | 7.8 |
| 18 | High TDGA and Low Temperature | Only about 10% of the particles incorporated had nucleation, and these had only one or two nucleation sites per particle. | 60 | 8.4 |

EXAMPLE 19

Steel blocks were rack-plated with an electroless Ni-Co-B alloy composite coating containing 9μ diamond "A" particles by the technique used for Example 6 supra.

The blocks were mounted on shelf 12 of the plating apparatus of FIG. IX, given a conventional preplating treatment for steel and then immersed in an electroless Ni-Co-B plating bath of the following composition:

| | |
|---|---|
| Nickel acetate .4$H_2O$ | 44 gms/liter |
| Cobaltous acetate .4$H_2O$ | 6 gms/liter |
| Sodium citrate .2$H_2O$ | 25 gms/liter |
| Lactic acid | 25 gm/liter |
| Dimethylamine borane | 2.5 gm/liter |
| Thiodiglycolic acid | 0.1 gm/liter |
| Santomerse S | 0.1 g/liter |
| $NH_4OH$ in quantity required to maintain pH at 6.4 | |
| Water | Balance |

The plating bath was maintained at 60° C. and the blocks were plated with an electroless Ni-Co-B strike for 20 mins. Then a slurry containing a sufficient quantity of 9μ dia. diamond "A" to establish a concentration of 2 gms/liter was introduced into the plating bath. The diamond particles were kept in suspension by a mechanically-driven, paddle-type stirrer rotating at about 350 rpm. Plating was conducted for 3 hours.

The composite top surface coatings obtained were given a metallographic examination and it was found that a uniform dispersion of diamond particles existed throughout the Ni-Co-B matrix.

Quantimet analysis of photomicrographs of the same surface disclosed that the coating contained about 11 volume per cent of the particulate phase, and scanning electron photomicrographs revealed nucleation of plating at multitudinous sites on individual diamond particles incorporated into the surface.

In an 85 minute accelerated yarnline wear test, conducted under the identical conditions for Example 1, the wear rate was 4.2μ/hr.

Conclusion: A Ni-Co-B matrix/diamond "A" composite coating appears to be at least as wear-resistant as the Ni-B/diamond "A" composite coating of Example 1.

EXAMPLE 20

Steel blocks were rack-plated with an electroless Ni-P alloy composite coating containing 9μ dia. diamond "A" particles by the technique described supra for Example 6 using Enthone, Inc.'s Enplate NI-415 process.

The steel blocks were mounted on shelf 12 of the apparatus of FIG. IX, given the conventional pretreatment for steel, and then immersed in an Enplate NI-415 bath and given a 30-min. strike at 85° C. Then a suspension of 9μ diameter diamond "A" particles was added to give 1 gm/liter and plating continued. The diamond powder was maintained in suspension by a mechanically driven, paddle type stirrer rotated at about 350 rpm. The blocks were removed from the bath after 1.5 hrs. of composite plating.

Metallographic examination of the composite coating on the top horizontal surface of the steel blocks showed a uniform dispersion of the diamond particles in the electroless Ni-P matrix. The coating was found to contain about 32 vol. per cent of the particulate phase.

In an 85 minute accelerated wear test conducted as hereinbefore described for Example 1 the measured wear rate was 3.8μ/hr.

A second set of steel blocks was rack-plated as hereinbefore described for the first set of steel blocks of this Example, except that the 30-min. strike was omitted, and the appearance and diamond content obtained was the same. It is concluded that, with a metal substrate, a strike is not always necessary.

EXAMPLE 21

Steel blocks were rack-plated with an electroless Co-B alloy composite coating containing 6μ dia. diamond "A" by the technique described for Example 6 supra.

The bath employed had the following composition:

| | |
|---|---|
| $CoSO_4\ 7H_2O$ | 25 g/l |
| $(NH_4)_2SO_4$ | 60 g/l |
| Sodium citrate $.2H_2O$ | 40 g/l |
| Dimethylamine borane | 2.5 g/l |
| $NH_4OH$ in amount maintaining pH at | 7.5 |

-continued

| | |
|---|---|
| Water | Balance |
| Bath temperature | 80° C |

The blocks were first given an electroless Co-B strike for 25 mins. Then a slurry containing 6μ dia. diamond "A" was added to give a plating bath concentration of 1 g/l, the diamond particles being kept in suspension by a power-driven paddle-type stirrer. Composite plating in the presence of diamond was done for 105 mins. Approximately five minutes after the steel blocks were removed, the bath decomposed due to excessive plating on the diamond particles suspended therein.

Metallographic examination of the composite coating on the top horizontal surface of the blocks confirmed uniform dispersion of the diamond particles within the Co-B matrix, and the diamond concentration was measured at 25 volume per cent. Scanning electron microscope photomicrographs showed nucleation of plating at multitudinous sites on individual diamond particles incorporated in the coating.

A wear test specimen was sliced from a plated block using a wafering machine provided with a 10 cm. dia., 1.2 cm. thick SiC cutting disk driven at 6500 rpm by a ⅓ HP motor. An aqueous solution of Johnson Wax Co's. T.L.-131 cutting fluid was sprayed on the disk as coolant. Portions of the coating became detached and flaked away from the substrate at several locations on the top horizontal surface of the steel substrate, indicating that the coating adhesion was unsatisfactory. None of the other plated steel specimens of the other Examples exhibited coating detachment when similarly cut, except for those specimens of Examples 27 and 28, which were also plated from an active bath which exhibited a tendency to decompose.

An accelerated yarnline wear test was conducted in an area free from coating dislodgement under the conditions hereinbefore reported for Example 1. In an 85 minute test, the wear rate was 3.2μ/hr.

EXAMPLE 22

Steel blocks were rack-plated with an electroless Co-P alloy composite coating containing 9μ dia. diamond "A" by the technique of Example 6.

The blocks were first given the conventional preplating treatment for steel and then immersed in an electroless Co-P plating bath of the following composition:

| | |
|---|---|
| $CoCl_2 6H_2O$ | 30 g/l |
| $NH_4Cl$ | 50 g/l |
| Sodium citrate $.2H_2O$ | 80 g/l |
| $NaH_2PO_2H_2O$ | 10 g/l |
| $NH_4OH$ in quantity maintaining pH at | 9 |
| Water | Balance |
| Plating bath temperature | 90° C |

The blocks were plated with an electroless Co-P strike for 50 mins. Then sufficient 9μ dia. diamond "A" was slowly added to establish a concentration of 0.5 g/l, the particles being kept in suspension by a power-driven paddle-type stirrer. Composite plating in the presence of diamonds was continued for 4 hours.

SEM photomicrographs reveal that nucleation of electroless Co-P alloy did not occur on the diamond "A" particles incorporated in the coating.

EXAMPLE 23

Rectangular blocks and coupons of molded ABS and fiber-reinforced ABS resins were given the polymer pretreatment hereinbefore described for ABS resins and were then coated by the following procedure:

a. 10 min. strike in a 4-liter beaker by the electroless Ni-B process described for Example 1, b. 1 hr. of tumble plating by the electroless Ni-B process described in Example 1 in a bath free of particle additions, and c. 3 hrs. of composite tumble plating by the electroless Ni-B process described for Example 1 in a bath containing a dispersion of 2 g/l of 12–22$\mu$ dia. diamond "A" particles.

SEM photomicrographs of the composite coating surface revealed that nucleation of plating had occurred at a multitude of sites on individual incorporated diamond particles. The coating contained about 16 vol. per cent of particulate phase.

In an 85 minute accelerated yarnline wear test conducted as described in Example 1, the measured wear rate was 3.4$\mu$/hr.

EXAMPLE 24

Rectangular blocks and coupons of molded ABS and fiber-reinforced ABS resins were given the polymer pretreatment hereinbefore described for ABS resins and were then coated by the following procedure:

a. 10 min. strike in a 4-liter beaker by the electroless Ni-B process employed in Example 1, b. 1 hr. of tumble plating by the electroless Ni-B process employed in Example 1 in a bath free of particle additions, and c. 3⅔ hrs. of composite tumble plating by the electroless Ni-B process described for Example 1 in a bath containing a dispersion of −600 mesh $\alpha$-$Al_2O_3$ powder.

Metallographic examination of the composite coating showed it to be nonporous and possessed of a uniform dispersion of $Al_2O_3$ particles throughout the electroless Ni-B alloy matrix. The coating contained 11 volume per cent of the particulate phase. The size of the majority of the $Al_2O_3$ particles observed in the photomicrographs ranged from about 6$\mu$ to about 21$\mu$.

In a 5 minute accelerated yarnline wear test conducted as described for Examples 1 through 5, the wear rate on the electroless Ni-B/6–21$\mu$ $Al_2O_3$ was 161$\mu$/hr., which is more than 47 times greater than that for the comparable electroless Ni-B/12–22$\mu$ diamond "A" coating described for Example 23.

EXAMPLE 25

A steel block was rack-plated with an electroless Co-B alloy composite coating containing 6$\mu$ dia. diamond "A" particles in a 1-liter bath stored in a 2 liter glass beaker 12 cm. in diameter.

The block was suspended from a nickel wire, given a conventional preplating treatment for steel and then immersed in an electroless Co-B plating bath of the following composition:

| | |
|---|---|
| $CoCl_2.6H_2O$ | 30 g/l |
| Sodium citrate $.2H_2O$ | 80 g/l |
| $NH_4Cl$ | 50 g/l |
| Dimethylamine borane | 2.5 g/l |
| $NH_4OH$ in amount maintaining pH at | 8–9 |
| Water | Balance |

-continued

| | |
|---|---|
| Plating bath temperature | 90° C. |

The block was first plated with an electroless Co-B strike for 85 minutes. Then the bath temperature was increased to 95° C. and a slurry containing enough 6$\mu$ dia. diamond "A" particles to establish a concentration of 0.5 g/l was added to the plating bath and kept in suspension by a power-driven paddle-type stirrer. Composite plating in the presence of diamond particles was continued for 2.5 hrs. The bath showed no signs of decomposition.

SEM photomicrographs revealed that no nucleation of electroless Co-B alloy occurred on the diamond "A" particles incorporated in the coating.

The conclusion drawn from Examples 21, 22 and 25 is that bath composition can affect whether or not nucleation of electroless alloy grains will occur on diamond "A" particles.

Thus, Example 21 showed that a Co-B/6$\mu$ diamond "A" composite coating from a bath formulated with $CoSO_4.7H_2O$ did have nucleation, whereas, in Example 25, the Co-B/6$\mu$ diamond coating formulated from a $CoCl_2.6H_2O$ bath did not show nucleation, nor did the Co-P/9$\mu$ diamond "A" coating of Example 22.

EXAMPLE 26

Steel blocks were rack-plated with an electroless Ni-Co-B alloy composite coating containing 9$\mu$ diameter natural diamonds by the same technique and plating process and bath composition described for Example 19.

Scanning electron micrographs revealed nucleation of plating at a multitude of sites on individual diamond particles incorporated into the coating on the top horizontal surface of the blocks. This was the first indication of nucleation at numerous sites on natural diamond.

The results of accelerated wear tests and determination of volume per cent particulate loading for this coating, and the Ni-Co-B/9$\mu$ diamond "A" coating reported in Example 19 are as follows:

| | Coating | Vol % Particles | Test Time, min. | Wear Rate, $\mu$/hr. |
|---|---|---|---|---|
| Example 19 | Ni-Co-B/9-$\mu$ diamond "A" | 11 | 85 | 4.2 |
| Example 26 | Ni-Co-B/9-$\mu$ Natural diamond | 37 | 85 | 5.5 |

Between Example 1, and Examples 19 and 26, two changes were made: (1) The temperature was raised from 55° C. to 60° C. and (2) 6 gm/liter of nickel acetate was replaced by 6 gm/liter of cobalt acetate. As a result of these two changes, nucleation took place on natural diamond as well as on diamond "A" during their incorporation into the coating.

EXAMPLES 27 and 28

Steel blocks were rack-plated with an electroless Ni-CO-B/9$\mu$ natural diamond composite coating (Ex. 27) and an electroless Ni-Co-B/9$\mu$ diamond "A" composite coating (Ex. 28) by the same technique as described for Example 19.

This process differed from that used in Example 19 and in Example 26 in four ways:

1. TDGA concentration was increased from 0.10 to 0.14.

2. The Santomerse S wetting agent concentration was decreased from 0.1 g/l to zero.

3. The concentration of diamond "A" powder in the bath was decreased from 2 g/l to 1 g/l.

4. The temperature of the bath was increased from 60° C. to 65° C.

NOTE: The reason the bath temperature was increased was because the plating rate at 60° C. was considered to be too low.

The bath used in Example 28 decomposed after 5 hrs. of operation due to initiation of plating on the diamond "A" particles suspended in the plating bath.

Scanning electron micrographs of the top horizontal surfaces of plated steel blocks show much nucleation on both the diamond "A" particles incorporated into the coating in Ex. 28 and the natural diamond particles incorporated into the coating in Ex. 27.

Conclusions:

The Ni-Co-B baths hereinbefore described are excessively active, in the sense that they will readily initiate plating on powder particles added to them. When particles with high-energy surfaces, such as diamond "A" are added to them, they can decompose due to initiation of plating on the suspended particles which rapidly depletes the bath of metallic ions and reducing agent. When particles with low-energy surfaces, such as natural diamonds, are added to these "active" baths, plating initates on the particles as they are incorporated into a composite coating being deposited on a substrate.

EXAMPLE 29

Electroplate v. Electroless Plate

A comparison was made between diamond-containing electroless Ni-P coatings and diamond-containing electroplated nickel coatings. Various samples were prepared to permit comparison, these being plain steel, an alumina-containing electroless Ni-P, and solid sintered tungsten carbide in a cobalt matrix. The tests were carried out on a Dow-Corning Corp. Model LFW-1 "Alpha" Friction and Wear Testing Machine. The essential mechanism of the test is the rubbing of a lubricated rotating ring against the surface of a specimen under constant applied load. After a predetermined number of revolutions of the ring, the specimen was inspected, and the volume worn away by the rotating wheel was calculated. The test parameters were:

1. Test Ring: 4620 steel, Rockwell C (Rc) 62

2. Test Block: 4620 steel, Rc 62 (also used as substrate for coated samples)

3. Normal Load: 150 lbs.

4. Mean Hertzian Stress: 55,000 psi

5. Testing Speed: 197 rpm (71 ft/min. sliding velocity)

6. Test Duration: 250,000 revolutions

7. Lubricant: SAE 10 oil

The relative wear-resistance of the specimens when normalized around the performance of an uncoated 4620 steel block was as follows, it being understood that increasing values denote progressively greater wear resistance.

| | |
|---|---|
| 4620 Steel, Rc 62 | 1.00 |
| Aluminum oxide/Ni-P (electroless)* | 1.00 |
| Natural diamond/Ni-P (electroless)* | 2.74 |

-continued

| | |
|---|---|
| Diamond "A"/Ni (electroplated)* | 4.98 |
| Diamond "A"/Ni-P (electroless)* | 6.83 |
| Sintered tungsten carbide (12% Cobalt) | 11.58 |

*Composite coatings containing 20 volume % hard particles, 1 -micron size.

The "electroless" samples in the above list were prepared according to the same detailed manner as in Examples 6 and 7, supra. The "electroplated" sample was prepared by a commercial nickel electroplating firm, using sample blocks of 4620 steel substrate and diamonds furnished. The tungsten carbide sample was a piece of commercial material.

EXAMPLE 30

It as been found that concomitant particulate solids-electroless plate coating according to this invention is not only effective for interrecess coating but also preserves the integrity of sharp edges in structures where sharp edges are essential for good operation.

The importance of uniform surface maintenance inside jets and orifices, together with retention of uniform sharp edge configurations at jet and orifice outlets, is discussed in fluid dynamics texts such as, for example, Chapters 5 and 6 of "Mechanics of Fluids" by Glenn Murphy, published by International Textbook Company.

Referring to FIGS. X–XII, inclusive, one design of jet coated successfully according to this invention is the air jet utilized for interlacing multi-filament textile yarns, as taught in U.S. Pat. No. 3,115,691.

As shown in FIG. X, an interlacing apparatus can utilize two air jets 51 of typical diameters in the range of about 0.020 to about 0.10 inch inclined towards one another at an angle $\alpha$ of, typically, 60°, so that their center lines approximately intersect at a striker plate 49 disposed, typically, 0.008–0.120 inch from the jet housing. A multi-filament yarn 56 is passed centrally of the jets and the inside face of striker plate 49$\alpha$, as shown, and is interlaced by the action of air vortices created by the jets. It should be mentioned that interlacing whips the yarn about quite violently and there occur repeated yarn impacts with the face of jet body 50 as well as across the jet orifices.

It has been found that jet-to-jet passage uniformity as well as sharp and true opening edge uniformity is extremely critical to interlacing yarn jet performance. Thus, coating build-up as shown at E and F, FIG. X, which almost always occurs to some degree during such operations as plasma and flame spray coating, even though the holes may be sealed by removable polymeric plugs such as a silicone resin, is absolutely prohibitive. In addition, chipped edges such as denoted at G which sometimes result when polymer plugs are disengaged, cannot be tolerated. Thus, the standard of acceptance required is a sharply defined edge, such as that shown at H.

It is extremely inconvenient and disruptive of production to periodically recondition textile interlacing jets, since a multiplicity are assembled together with their housings 50 in parallel connection with a common air manifold 53 via port 55.

As shown in FIG. XI, it is convenient in such assemblies to utilize the back sides of neighboring jets as striker plates 49 for adjoining jets 51 directed towards them. Screws 52 secure individual jets into a tight module, whereas machine screws 54 attach the modules to the manifold casing 53.

In this Example, 12 interlacing jets of the construction hereinbefore described were molded from an acicular rutile reinforced ABS resin. These jets measured 1.14 inch short length × 1.18 inch long length and had discharge openings 0.036 inch diameter. They were plated with an electroless Ni-B 3$\mu$ diamond "A" composite coating using the following procedure:

The jets were first given the hereinbefore-described preplating treatment for ABS resins and were then coated as detailed:

a. 10 strike with gentle agitation in a 4-liter beaker by the electroless Ni-B process of Example 1.

b. 22 min. of tumble plating by the electroless Ni-B process of Example 1 in a bath free of particle additions.

c. 72 min. of composite tumble plating by the electroless process of Example 1 in a bath containing a dispersion of 8 g/l of 3-$\mu$ diamond "A" particles.

The coating procedure was identical to that cited in Example 13 for plating jet venturi units, except that the total plating time was decreased from 230 to 104 min. The plating time was decreased to minimize coating thickness and thereby retain the edge sharpness at the exit orifices of the air holes in the jets. As hereinbefore stated, sharpness and uniformity of the air orifices are important parameters that affect jet performance and yarn quality.

Photomicrographs and scanning electron micrographs of the jet orifices revealed that they were well coated on the interior and uniform, with sharp edges free of defects. The radius of the orifice edge was increased only by an amount comparable to the total coating thickness, which was about 0.4 mils. The scanning electron micrographs also revealed that the coating consisted of a uniform dispersion of 3$\mu$ diameter diamond particles in an electroless Ni-B matrix. The surface roughness in the as-plated condition ranged from 40 to 60 AA (i.e., arithmetic average).

A test as conducted with the plated plastic interlace jets in which 70-denier/34-filament R-25-285 nylon yarn was interlaced for a period of 72 hours. The yarn was of acceptable quality and interlace level. Characterization by scanning electron microscopy and surface profilometry of critical areas on the surfaces of the jets after testing failed to reveal any evidence of abrasive wear.

By way of comparison, a Vasco 7152 Tool Steel, such as hereinbefore described with reference to Table 3, shows a relatively high wear rate.

EVALUATION OF WEAR TEST RESULTS

The wear grooves of the electroless alloy/diamond composites were not only measured to determine wear rate but were also studied to determine the strength of bonding of the particulate diamond within the coating matrix for each of the three diamonds tested, i.e., diamond "A," diamond "B" and natural diamond. Thus, the wear grooves were carefully examined by scanning electron microscopy and light microscopy to determine the types of wear suffered and, also, whether diamond pull-out occurred under thread-line abrasion.

Referring to FIG. IV (2860X), it is clear that extensive diamond pullout occurred for the electroless Ni-B alloy/9$\mu$ natural diamond composite coating under a 24 hr. 15-denier full dull nylon monofilament yarnline test wherein the yarn speed was 1000 yd. at 15 gms. tension and 10° break angle. The fact that the areas indicated by arrows (1) in FIG. IV are particle pull-outs can be confirmed by comparing the crater shapes with the shapes of the natural diamond particles (3) remaining in the matrix. In general, the standard yarnline wear test showed a considerable number of natural diamond particle pull-outs from the Ni-B alloy matrix, whereas essentially no pull-outs were observed in an identical standard test evaluation of Ni-B alloy/9$\mu$ "A" composites.

This is drammatically shown in FIG. V (2640X), taken after an accelerated yarnline test, wherein the wear scar (1) of the running yarnline is plainly seen, without, however, any particle loss craters.

Additional light microscopy examinations of accelerated yarnline wear tests for composites containing 9$\mu$ diamond "B" particles confirmed the superior wear resistance of the composites containing diamond "A," which showed little wear groove polishing action.

In contrast, FIG. VI, a 250X microscopic plan view of the entire wear sample width, shows the wear groove (2) of the same diamond "A" composite shown in localized magnification in FIG. IV. The corresponding views for the 9$\mu$ natural diamond particle composite (FIG. VII) and the diamond "B" composite of FIG. VIII show the extensive matrix metal-polishing action which occurs in both of these yarnline wear tracks during yarnline testing. This is due to the cutting action of the 0.3$\mu$ $\alpha Al_2O_3$ particles on the threadline, which removes the electroless alloy matrix. The majority of matrix removal occurs after particle pull-out.

An attempt was made to obtain a quantitative comparison of particle pull-out magnitudes for the three diamond types. In this, an SEM montage at ≈ 1400X of (a) the bottom and (b) one side of the wear groove along with a portion of as-plated surface adjoining the wear groove. An area 12 inches × 1.5 inch (Area I) was then outlined on the as-plated surface and side of the wear groove of each montage such that the outlined area contained about half of each region. A similar 12 inches × 1.5 inch area (Area II) was then outlined on the bottom of the wear groove such that one of the 12 inches sides of Areas I and II was common. The number of diamonds and diamond craters was then counted to give a total as received diamond count for each Area. The number of diamond craters was essentially zero for Area II, the bottom of the wear groove, for all three types of diamonds; however, a number of craters were seen to exist in Area I of the natural and diamond "B" composites, whereas the diamond "A" composite Area I showed essentially zero craters. The results obtained are as follows:

Table 10

DIAMOND PULL-OUT FROM ACCELERATED YARNLINE WEAR TEST GROOVES
(Ni—B Alloy Composite prepared by Ex. 1–3 techniques)

| | Area I* | Area II** | Per Cent Difference | Comments |
|---|---|---|---|---|
| Diamond Count for Diamond "B" | 50 | 34 | − 32% | Difference primarily due to diamond removal from the bottom of the wear grooves |
| Diamond Count for Natural Diamond | 60 | 45 | − 25% | |
| Diamond Count | 42 | 46 | + 9.5% | Difference due to |

Table 10-continued

DIAMOND PULL-OUT FROM ACCELERATED YARNLINE WEAR TEST GROOVES
(Ni—B Alloy Composite prepared by Ex. 1-3 techniques)

| | Area I* | Area II** | Per Cent Difference | Comments |
|---|---|---|---|---|
| for Diamond "A" | | | | randomness and uncovering of diamonds on the bottom of the wear groove which were just under the surface of Ni—B alloy matrix. |

*Side of wear groove and adjacent as-plated composite surface.
**Bottom of wear groove, area where the majority of wear occurs.

In appraising the results tabulated, it is estimated that approximately 2–6% error might exist due to the coexistence of matrix multi-grain depressions which can possibly be mistaken for craters, depending on the extent of the polishing concealment effected by the running yarn passage.

The significance of the comparison portrayed by FIGS. VI, VII and VIII is, of course, that not only is the surface wear substantially greater for natural diamond and diamond "B" composites than for diamond "A," but that the detritus removed from the coatings is at the same time markedly higher. Such detritus, incorporating, as it does, diamond particles, becomes an intolerable contaminant if retained in the wear regions vicinty, as would be the case with a bearing or other similar installation wherein the contacting surface is not being swept clean continuously by an agency such as the running yarnline employed in the tests described.

From the foregoing, it is apparent that the diamond "A" particles are much more firmly secured within the metal matrix than are the diamond "B" and natural diamond particles. It is assumed that this superior retention is due to the fact that diamond "A" particles are able to promote nucleation and matrix grain growth when they are at the matrix surface growing region.

What is claimed is:

1. A coated article formed by electroless plating comprising a co-deposited uniform dispersion of diamond particles secured by substantial nucleation within a metallic matrix comprising one of the group consisting of: (1) an alloy including a metal of the sub-group made up of nickel, cobalt and mixtures thereof with one of the elements phosphorus, boron and mixtures thereof and (2) elemental copper, deposited on a supporting substrate consisting of polymer, metal, ceramic or glass.

2. A method of forming a composite structure on an article by electroless plating comprising immersing said article in a stable electroless plating bath having a composition effecting concurrent deposition of particulate diamond *having a particle size in the range of 0.1μ to 75μ* dispersed in a metallic matrix comprising one of the group consisting of: (1) an alloy including a metal of the sub-group made up of nickel, cobalt and mixtures thereof with one of the elements phosphorus, boron and mixtures thereof and (2) elemental copper, while maintaining agitation of said bath retaining said particulate diamond in suspension, and removing said article carrying said composite structure from said bath [when] *after* said composite structure has been plated out on said article in preselected amount.

3. A coated article formed by electroless plating consisting of a shaped substrate, a metallic matrix coating deposited on said shaped substrate, and a uniform dispersion of co-deposited diamond particles secured by nucleation bonding within said metallic matrix, wherein 1. said substrate is one of the group consisting of (a) an organic polymer, including reinforced organic polymers, (b) metals, (c) ceramics, (d) glass,
2. said metallic matrix consists primarily of at least one of the group consisting of (a) nickel, (b) cobalt, (c) copper, together with smaller proportions of other components commonly codeposited from electroless plating baths, and
3. said diamond particles constitute from 1 to 50% by volume of said metallic matrix, with a particle size ranging from about 0.1μ to about 75μ, but predominantly in the size range between 0.5μ to 25μ.

4. A coated article formed by electroless plating consisting of a shaped substrate, a metallic matrix coating deposited on said shaped substrate, and a uniform dispersion of co-deposited diamond particles secured by nucleation bonding within said metallic matrix, wherein 1. said substrate is one of the group consisting of (a) an organic polymer, including reinforced organic polymers, (b) metals, (c) ceramics, (d) glass,
2. said metallic matrix consists primarily of at least one of the group consisting of (a) nickel, (b) cobalt, (c) copper, together with smaller proportions of other components commonly codeposited from electroless plating baths, and
3. said diamond particles constitute from 1 to 50% by volume of said metallic matrix, with a particle size ranging from about 0.1μ to 75μ but predominantly in the size range between 0.5μ to 25μ, and said diamond particles individually consist of many individual crystallities tightly bonded to one another in essentially unoriented pattern giving polycrystalline particles having many irregular projections, ledges and craters.

5. A coated article formed by electroless plating according to claim 3 wherein said article is a fluid jet provided with a discharge orifice.

6. A coated article formed by electroless plating according to claim 4 wherein said article is a fluid jet provided with a discharge orifice.

* * * * *

UNITED STATES PATENT OFFICE

CERTIFICATE OF CORRECTION

PATENT NO. : Re. 29,285

DATED : Reissued June 28, 1977

INVENTOR(S) : THEODORE PETER CHRISTINI, ALBERT LAWRENCE EUSTICE and ARTHUR HUGHES GRAHAM It is certified that error appears in the above-identified patent and that said Letters Patent are hereby corrected as shown below:

Col. 1, line 67, "III(M)" should read --IIIE(M)---.
Col. 3, line 67, "min. strike" should read --alloy--.
Col. 3, line 68, before "2,658,841" insert --2,532,283--.
Col. 9, Table IB, the heading "Number" should read --Example Number--; the heading "Yarnline Block" should read --Yarnline Wear Block--; the heading "Washer" should read --Thrust Washer--.
Col. 17, line 21, "bult" should read --bulk--.
Col. 29, line 41, after "Ni-P" insert --plate--.
Col. 31, line 13, before "strike" insert --min.--.
Col. 32, line 9, before "'A'" insert --diamond--.
Col. 32, line 11, "drammatically" should read --dramatically--.
Col. 32, in Table 10, the brace around the first remarks under "Comments" should be extended down to include spacing opposite "Diamond Count for Natural Diamond".

Signed and Sealed this

*Tenth* Day of *January 1978*

[SEAL]

*Attest:*

RUTH C. MASON
*Attesting Officer*

LUTRELLE F. PARKER
*Acting Commissioner of Patents and Trademarks*

REEXAMINATION CERTIFICATE (101st)

United States Patent [19]

Christini et al.

[11] B1 Re. 29,285

[45] Certificate Issued Jul. 5, 1983

[54] METHOD FOR CONCOMITANT PARTICULATE DIAMOND DEPOSITION IN ELECTROLESS PLATING, AND THE PRODUCT THEREOF

[75] Inventors: Theodore Peter Christini, Dushore, Pa.; Albert Lawrence Eustice, Lewiston, N.Y.; Arthur Hughes Graham, Wilmington, Del.

[73] Assignee: E. I. Du Pont de Nemours and Company, Wilmington, Del.

Reexamination Request

No. 90/000,120, Dec. 3, 1981

Reexamination Certificate for:

| | |
|---|---|
| Patent No.: | **Re. 29,285** |
| Issued: | **Jun. 28, 1977** |
| Appl. No.: | **694,047** |
| Filed: | **Jun. 7, 1976** |

Certificate of Correction issued Jan. 10, 1978.

Related U.S. Patent Documents

Reissue of:

| | |
|---|---|
| [64] Patent No.: | **3,936,577** |
| Issued: | **Feb. 3, 1976** |
| Appl. No.: | **341,529** |
| Filed: | **Mar. 15, 1973** |

Related U.S. Application Data

[63] Continuation-in-part of Ser. No. 208,233, Dec. 15, 1971, abandoned.

[51] Int. Cl.[3] ..... C23C 3/02

[52] U.S. Cl.[3] ..... 428/544; 51/309; 106/1.22; 106/1.27; 75/0.5R; 427/305; 427/438; 427/443.1; 428/323; 428/426; 428/433; 428/671; 428/678

[58] Field of Search ... 427/443.1(c); 428/544, 671, 678; 106/1.22, 1.27

[56] References Cited

U.S. PATENT DOCUMENTS

| | | | |
|---|---|---|---|
| 2,571,772 | 10/1951 | Simons. | |
| 2,858,256 | 10/1958 | Fahnoe et al. | 204/4 |
| 3,061,525 | 10/1962 | Grazen | 204/9 |
| 3,298,802 | 1/1967 | Odekerken | 29/194 |
| 3,379,556 | 4/1968 | Chiecchi | 117/47 |
| 3,394,440 | 7/1968 | van Holten | 23/1 |
| 3,401,019 | 9/1968 | Cowan et al. | 23/209.1 |
| 3,465,416 | 9/1969 | Wellborn | 427/217 |
| 3,556,839 | 11/1971 | Roy | 427/217 |
| 3,753,667 | 8/1973 | Metzger et al. | 29/195 |

FOREIGN PATENT DOCUMENTS

| | | |
|---|---|---|
| 1041753 | 9/1966 | United Kingdom. |
| 1476024 | 9/1975 | United Kingdom. |

OTHER PUBLICATIONS

Characterization of Manufactured Diamond, R. Komanduri, Proceedings: Diamond-partner in Productivity, 1974, pp. 175–189.

Diamond—as a crystal and as an industrial material, Dr. M. Seal, Industrial Diamond Review, March, 1968, pp. 104–110.

(List Continued on next page.)

*Primary Examiner*—J. D. Smith

[57] ABSTRACT

This invention is a method for depositing on an article a coating containing at least one member of the group metals and metal alloys plus particulate dispersed diamond comprising contacting the surface of the article with a stable electroless plating bath consisting essentially of an aqueous solution of soluble constituents of the group, electroless reducing agent therefor, a suspension of diamond particles therein and a stabilizer, and maintaining the diamond particles in suspension throughout the bath during the coating of the article for a time sufficient to produce a preselected depth of coating on the article, and the coated article per se.

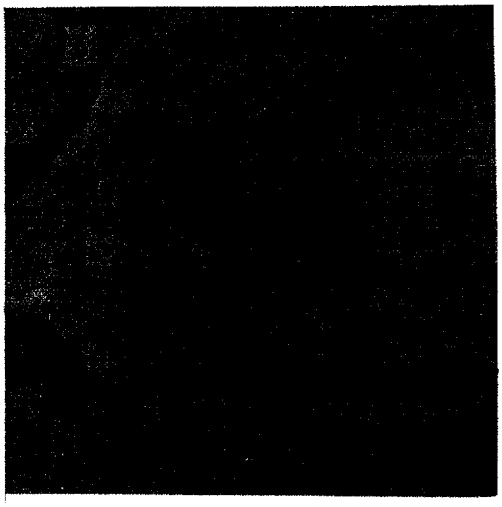

(1) RECESSED GROWTH LEDGE (2) CRATER (3) UPSTANDING GROWTH PROJECTION (4) Ni-B ALLOY GRAINS NUCLEATED ON DIAMOND "A" SURFACE (5) Ni-B ALLOY GRAINS NUCLEATED ON DIAMOND "A" EDGES (6) Ni-B ALLOY GRAIN MATRIX (7) DIAMOND SURFACE

OTHER PUBLICATIONS

Particle Enhanced Electroless Coatings, Donald J. Kenton, Presented At The ASM Surtech & Surface Coating Exposition, Dearborn, Mich., May 1982.

Diamond—Containing Electroless Nickel Coating, J. Lukschandel Trans. Inst. Metal Finishing (1978) pp. 118-120.

ESK—Information, NIDIAMANT.

NIDIAMANT German publication and Translation into English.

Microscope Studies of an Improved Sensitizer Solution, N. Feldstein et al., J. Electrochem. Soc., Electrochemical Science and Technology, Jul. 1973, pp. 875-879.

Chemically Deposited Composites—A New Generation of Electroless Coatings, F. N. Hubbell, Transactions of the Institute of Metal Finishing, 1978, vol. 56, pp. 65-69.

Metallic Coatings for Patterns and Core Boxes, F. N. Hubbell, Annual Meeting of the National Association of Pattern Manufacturers, 10/10-13/76, pp. 1-8.

How to protect molds against abrasion and corrosion, F. N. Hubbell, Plastics Engineering, vol. 32, No. 12, Dec. 1976.

Niculoy 22—Shipley.

Friction Units for Texturing etc., H. Weigert Textile Industries, English Edition, vol. 28/80 (Apr. 1978) § 63-67, pp. 1-8.

What You Should Know About DIAMONDIZING, Electrocoatings, Inc.

DIAMONDIZING Process Composite Coating, Electrocoatings, Inc., Apr. 9, 1973.

Odekerken, "Use of Co-Deposited Non-Conducting Materials to Improve the Corrosion Resistance of Nickel-Chromium Electro-Deposits", *Electroplating and Metal Finishing*, Jan. 1964, pp. 2-11.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the reissue patent, but has been deleted and is no longer a part of the reissue patent; matter printed in italics indicates additions made to the reissue patent.

AS A RESULT OF REEXAMINATION, IT HAS BEEN DETERMINED THAT:

The patentability of claims 4 and 6 is confirmed.

Claims 1-3 are determined to be patentable as amended:

1. A coated article formed by electroless plating comprising a co-deposited uniform dispersion of *polycrystalline* diamond particles secured by substantial nucleation within a metallic matrix comprising one of the group consisting of: (1) an alloy including a metal of the sub-group made up of nickel, cobalt and mixtures thereof with one of the elements phosphorus, boron and mixtures thereof and (2) elemental copper, deposited on a supporting substrate consisting of polymer, metal, ceramic or glass.

2. A method of forming a composite structure on an article by electroless plating comprising immersing said article in a stable electroless plating bath having a composition effecting concurrent deposition of particulate *polycrystalline* diamond *having a particle size in the range of 0.1μ to 75μ* dispersed in a metallic matrix comprising one of the group consisting of: (1) an alloy including a metal of the sub-group made up of nickel, cobalt and mixtures thereof with one of the elements phosphorus, boron and mixtures thereof and (2) elemental [elemental] copper, while maintaining agitation of said bath retaining said particulate diamond in suspension, and removing said article carrying said composite structure from said bath [when] *after* said composite structure has been plated out on said article in preselected amount.

3. A coated article formed by electroless plating consisting of a shaped substrate, a metallic matrix coating deposited on said shaped substrate, and a uniform dispersion of co-deposited *polycrystalline* diamond particles secured by nucleation bonding within said metallic matrix, wherein 1. said substrate is one of the group consisting of (a) an organic polymer, including reinforced organic polymers, (b) metals, (c) ceramics, (d) glass,
2. said metallic matrix consists primarily of at least one of the group consisting of (a) nickel, (b) cobalt, (c) copper, together with smaller proportions of other components commonly codeposited from electroless plating baths, and
3. said diamond particles constitute from 1 to 50% by volume of said metallic matrix, with a particle size ranging from about 0.1μ to about 75μ, but predominantly in the size range between 0.5μ to 25μ.

Claim 5, dependent on an amended claim, is determined to be patentable.

New claims 7-14 are added and determined to be patentable.

*7. A coated article formed by electroless plating comprising a co-deposited uniform dispersion of diamond particles secured by substantial nucleation within a metallic matrix comprising one of the group consisting of: (1) an alloy including a metal of the sub-group made up of nickel, cobalt and mixtures thereof with one of the elements phosphorus, boron and mixtures thereof and (2) elemental copper, deposited on a supporting substrate consisting of polymer, metal, ceramic or glass and an electrolessly deposited strike layer deposited on said substrate beneath said co-deposited uniform dispersion of diamond particles in said metallic matrix, said strike layer being a metallic layer substantially free from solid particulate inclusions.*

*8. The article of claim 4, wherein said polycrystalline diamond particles, in comparison with other hard particles including natural diamond particles and non-polycrystalline synthetic diamond particles, are characterized by higher resistance to pull-out from said metallic matrix.*

*9. The article of claim 4, wherein said substrate is a textile machinery component and said coating provides a textile wear surface layer which is characterized by high resistance to surface wear due to contact with textile fibers or yarn.*

*10. A coated article formed by electroless plating consisting of a shaped substrate, a metallic matrix coating deposited on said shaped substrate, and a uniform dispersion of co-deposited diamond particles secured by nucleation bonding within said metallic matrix, wherein*

*1. said substrate is one of the group consisting of (a) an organic polymer, including reinforced organic polymers, (b) metals, (c) ceramics, (d) glass,*
*2. said metallic matrix consists primarily of at least one of the group consisting of (a) nickel, (b) cobalt, (c) copper, together with smaller proportions of other components commonly co-deposited from electroless plating baths, and*
*3. said diamond particles constitute from 1 to 50% by volume of said metallic matrix, with a particle size ranging from about 0.1μ to 75μ but predominantly in the size range between 0.5μ to 25μ, and said diamond particles individually consist of many individual crystallites tightly bonded to one another in essentially unoriented pattern giving polycrystalline particles having many irregular projections, ledges and craters, and*
*4. an electrolessly deposited metal strike layer deposited on said substrate prior to the deposition of said metallic matrix containing said diamond particles, said strike layer being substantially free from solid particulate inclusions.*

*11. The article of claim 10 wherein said polycrystalline diamond particles are characterized by higher resistance to pull-out from said metallic matrix, in comparison with other hard particles including natural diamond particles and non-polycrystalline synthetic diamond particles.*

*12. A method of forming a composite structure on an article by electroless plating comprising immersing said article in a stable electroless plating bath having a composition effecting concurrent deposition of particulate diamond having a particle size in the range of 0.1μ to 75μ dispersed in the metallic matrix comprising one of the group consisting of: (1) an alloy including a metal of the sub-group made up of nickel, cobalt and mixtures thereof with one of the elements phosphorus, boron and mix-*

*tures thereof and (2) elemental copper, while maintaining agitation of said bath retaining said particulate diamond in suspension, and removing said article carrying said composite structure from said bath after said composite structure has been plated out on said article in preselected amount and prior to immersion of said article in said stable electroless plating bath containing said particulate diamond, electrolessly depositing on said article a preliminary strike layer of metal, said strike layer being substantially free from solid particulate inclusions.*

*13. A method for producing a composite structure on a substrate to impart wear resistant surfaces to said substrate comprising co-depositing by*

*immersion of a substrate in a stable electroless plating bath,*

*a layer of a metallic matrix containing dispersed diamond particles,*

*(a) said substrate being a material selected from the group consisting of an organic polymer, including reinforced organic polymers, metals, ceramics and glass,*

*(b) said metallic matrix comprising one of the group consisting of: (1) an alloy including a metal of the sub-group made up of nickel, cobalt and mixtures thereof with one of the elements phosphorus, boron, and mixtures thereof, and (2) elemental copper, while maintaining agitation of said bath retaining said diamond particles in suspension, and*

*(c) said diamond particles constituting from 1 to 50% by volume of said metallic matrix, with a particle size ranging from about 0.1μ to 75μ but predominantly in the size range between 0.5μ to 25μ, and said diamond particles individually consisting of many individual crystallites tightly bonded to one another in essentially unoriented pattern giving polycrystalline particles having many irregular projections ledges and craters, and removing said plated substrate carrying said composite structure from said bath after said composite structure has been plated out on said article in preselected amount.*

*14. The method of claim 13 further comprising, before co-depositing said layer of metal containing dispersed diamond particles, electrolessly depositing on said substrate a metallic strike layer.*

* * * * *